US012535783B2

(12) United States Patent
Wang et al.

(10) Patent No.: US 12,535,783 B2
(45) Date of Patent: Jan. 27, 2026

(54) SELF-ADAPTIVE LITHIUM-ION BATTERY METHOD USING KNOWLEDGE-REINFORCED MACHINE LEARNING AND KALMAN FILTERING, ELECTRONIC DEVICE, AND STORAGE MEDIUM

(71) Applicants: Scibot Technology LLC, Fairfax, VA (US); Michigan Technological University, Houghton, MI (US)

(72) Inventors: Zequn Wang, Chengdu (CN); Guangxing Bai, Zibo (CN); Lun Li, Fairfax, VA (US)

(*) Notice: Subject to any disclaimer, the term of this patent is extended or adjusted under 35 U.S.C. 154(b) by 271 days.

(21) Appl. No.: 18/365,621

(22) Filed: Aug. 4, 2023

(65) Prior Publication Data

US 2025/0044753 A1 Feb. 6, 2025

(51) Int. Cl.
*G05B 13/02* (2006.01)
*G06N 3/08* (2023.01)

(52) U.S. Cl.
CPC ............ *G05B 13/027* (2013.01); *G06N 3/08* (2013.01)

(58) Field of Classification Search
CPC ........ G05B 13/027; G05B 7/00; G05B 11/00; G05B 15/00; G05B 21/00; G05B 24/00; G05B 2219/00; G06N 3/08; G06N 7/01; G06N 3/00; G06N 7/00; G06N 10/00; G06N 99/00
See application file for complete search history.

(56) References Cited

U.S. PATENT DOCUMENTS 12,271,664 B2 * 4/2025 Okabe .................... H01M 6/14

* cited by examiner

*Primary Examiner* — Yong J Choe
(74) *Attorney, Agent, or Firm* — Anova Law Group, PLLC

(57) ABSTRACT

The present disclosure provides a self-adaptive lithium-ion battery method using knowledge-reinforced machine learning and Kalman filtering, an electronic device, and a storage medium. The method includes training and synchronizing an artificial neural network with dual extended Kalman filters to capture battery capacity data of each of lithium-ion batteries; integrating prior knowledge with Gaussian process regression to form an integrated knowledge-reinforced Gaussian process regression; training a stochastic capacity degradation model by employing integrated knowledge-reinforced Gaussian process regression with captured battery capacity data to obtain a trained stochastic capacity degradation model; performing capacity prediction using trained stochastic capacity degradation model to obtain remaining useful life of one or more testing lithium-ion batteries; generating an air mass flow rate and a charging/discharging rate by a controller; and inputting the air mass flow rate and the charging/discharging rate into a battery thermal management system to improve battery RULs by adjusting lithium-ion battery temperature.

18 Claims, 31 Drawing Sheets

SELF-ADAPTIVE LITHIUM-ION BATTERY METHOD USING KNOWLEDGE-REINFORCED MACHINE LEARNING AND KALMAN FILTERING, ELECTRONIC DEVICE, AND STORAGE MEDIUM

FIELD OF THE DISCLOSURE

The present disclosure generally relates to the field of battery health management technology and, more particularly, relates to a self-adaptive lithium-ion battery method using knowledge-reinforced machine learning and Kalman filtering, an electronic device, and a storage medium.

BACKGROUND

Lithium-ion batteries have been widely used in various applications, such as mobile phones, laptops, and electric vehicles due to their high operating voltage, long cycle life, and low self-discharging rate. The failures of the lithium-ion batteries could lead to unexpected safety accidents, such as the internal short circuit, fire and the like. To prevent battery failures, it is of critical importance to predict the remaining useful life (RUL) of lithium-ion batteries in battery system lifecycle management. The prognostics and health management (PHM) of the lithium-ion battery permits the evaluation of the battery reliability in its actual life-cycle conditions, which may lower maintenance costs while increasing operational availability and utilization. Therefore, developing advanced battery PHM techniques is crucially important to mitigate battery operation risk. Various PHM techniques have demonstrated capability of supporting availability and reliability improvement of lithium-ion batteries through accurately predicting battery reliability and optimizing battery energy management.

With development of battery health modeling techniques, battery health prognostics have gained increasing attention, as these techniques may provide references for predictive maintenance and decision-making, thereby reducing maintenance costs and probabilities of target systems encountering fatal failures. Various lithium battery models, such as ampere-hour counting, open circuit voltage calculation and the Kalman filter, have been widely studied for estimating SoC (state of charge) and SoH (state of health) of batteries. With SoC estimations, optimal charging/discharging strategies may be obtained. Such strategies are useful for preventing overheating, overcharging, over-discharging and the like. Although these models are capable of predicting the battery aging process, accurate RUL prognostics are still difficult due to inability of such models to incorporate a large amount of data in real time while handling various sources of uncertainty.

Recently, data-driven methods have been widely investigated to directly extract the health information of batteries from condition monitoring data to predict battery RULs. For example, hybrid models/approaches, such as the state-space model with Gauss-Hermite particle filtering, particle swarm optimization with k-nearest neighbor regression, and the combination of ANN (artificial neural network), RVM (relevance vector machine) and SVM (support vector machine), are widely employed. Although significant progress has been made in RUL predictions of the lithium-ion batteries by the methods in the existing technology, it remains challenging to improve prediction accuracy and reduce uncertainty associated with the RUL estimations. A common limitation shared by above-mentioned data-driven machine learning methods lies in the lack of capability of incorporating prior knowledge in battery capacity fade in machine learning-based RUL prediction.

BRIEF SUMMARY OF THE DISCLOSURE

One aspect or embodiment of the present disclosure provides a self-adaptive lithium-ion battery method using knowledge-reinforced machine learning (KRML) and Kalman filtering. The method includes training an artificial neural network (ANN) and synchronizing the ANN with dual extended Kalman filters (DEKFs) to capture battery capacity data of each of one or more lithium-ion batteries; integrating prior knowledge with Gaussian process regression to form an integrated knowledge-reinforced Gaussian process regression; training a stochastic capacity degradation model by employing the integrated knowledge-reinforced Gaussian process regression with the captured battery capacity data to obtain a trained stochastic capacity degradation model; performing capacity prediction using the trained stochastic capacity degradation model to obtain remaining useful life (RUL) of one or more testing lithium-ion batteries; generating an air mass flow rate and a charging/discharging rate by a controller according to the RUL and a working condition of the one or more testing lithium-ion batteries; and inputting the air mass flow rate and the charging/discharging rate generated by the controller into a battery thermal management system (BTMS) to adjust lithium-ion battery temperature.

Another aspect or embodiment of the present disclosure provides an electronic device. The electronic device includes a memory, configured to store program instructions for performing a self-adaptive lithium-ion battery method using knowledge-reinforced machine learning and Kalman filtering; and a processor, coupled with the memory and, when executing the program instructions, configured for: training an artificial neural network and synchronizing the artificial neural network with dual extended Kalman filters to capture battery capacity data of each of one or more lithium-ion batteries; integrating prior knowledge with Gaussian process regression to form an integrated knowledge-reinforced Gaussian process regression; training a stochastic capacity degradation model by employing the integrated knowledge-reinforced Gaussian process regression with the captured battery capacity data to obtain a trained stochastic capacity degradation model; performing capacity prediction using the trained stochastic capacity degradation model to obtain remaining useful life of one or more testing lithium-ion batteries; generating an air mass flow rate and a charging/discharging rate by a controller according to the remaining useful life and a working condition of the one or more testing lithium-ion batteries; and inputting the air mass flow rate and the charging/discharging rate generated by the controller into a battery thermal management system to adjust lithium-ion battery temperature.

Another aspect or embodiment of the present disclosure provides a non-transitory computer-readable storage medium, containing program instructions for, when being executed by a processor, performing a self-adaptive lithium-ion battery method using knowledge-reinforced machine learning and Kalman filtering. The method includes training an artificial neural network and synchronizing the artificial neural network with dual extended Kalman filters to capture battery capacity data of each of one or more lithium-ion batteries; integrating prior knowledge with Gaussian process regression to form an integrated knowledge-reinforced Gaussian process regression; training a stochastic capacity degradation model by employing the integrated knowledge-reinforced Gaussian process regression with the captured battery capacity data to obtain a trained stochastic capacity degradation model; performing capacity prediction using the trained stochastic capacity degradation model to obtain remaining useful life of one or more testing lithium-ion batteries; generating an air mass flow rate and a charging/discharging rate by a controller according to the remaining useful life and a working condition of the one or more testing lithium-ion batteries; and inputting the air mass flow rate and the charging/discharging rate generated by the controller into a battery thermal management system to adjust lithium-ion battery temperature.

Other aspects or embodiments of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

References are made in detail to exemplary embodiments of present disclosure, which are illustrated in accompanying drawings. Wherever possible, same reference numbers are used throughout accompanying drawings to refer to same or similar parts.

To address above-mentioned problems and challenges, a knowledge-reinforced machine learning (KRML) framework is provided to learn stochastic degradation of lithium-ion batteries in the present disclosure. In KRML, an artificial neural network (ANN) may be trained using a historical dataset from a baseline battery to capture the dynamics of the battery within each working cycle while the stochastic capacity transition is learned by a knowledge-reinforced GP regression. Furthermore, the dual extended Kalman filter (DEKF) algorithm may be employed in real time to interact with the ANN and battery stochastic degradation model for online prediction of battery capacity.

According to various embodiments of the present disclosure, a self-adaptive lithium-ion battery method using knowledge-reinforced machine learning and Kalman filtering is described hereinafter.

Figure 1:
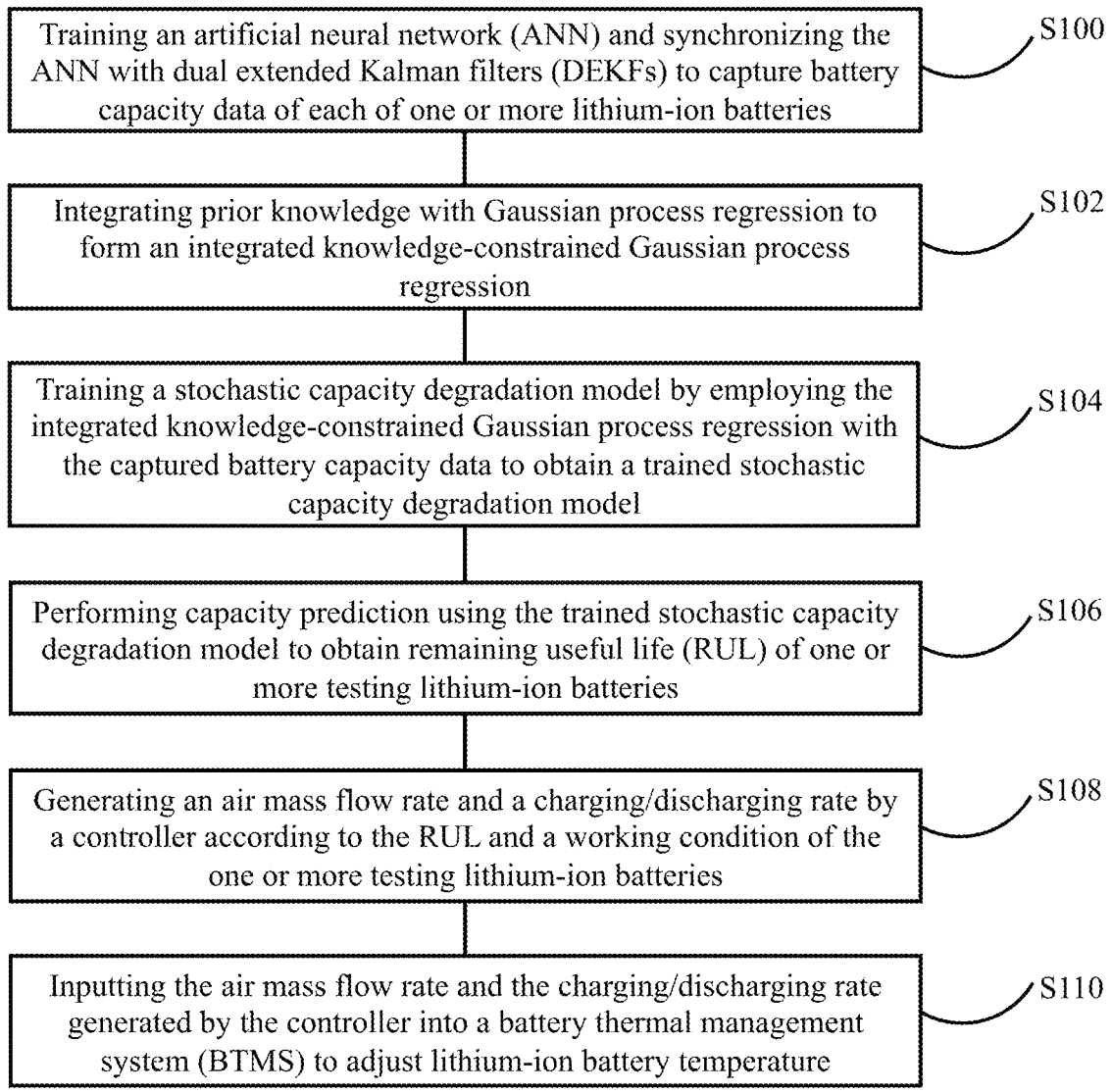
FIG. 1 depicts a flowchart of an exemplary self-adaptive lithium-ion battery method using knowledge-reinforced machine learning and Kalman filtering according to various disclosed embodiments of the present disclosure.

FIG. 1 depicts a flowchart of an exemplary self-adaptive lithium-ion battery method using KRML and Kalman filtering according to various disclosed embodiments of the present disclosure.

In S100, an ANN is trained and synchronized with DEKFs to capture battery capacity data of each of one or more lithium-ion batteries.

In S102, prior knowledge is integrated with Gaussian process regression to form an integrated knowledge-reinforced Gaussian process regression.

In S104, a stochastic capacity degradation model is trained by employing the integrated knowledge-reinforced Gaussian process regression with the captured battery capacity data to obtain a trained stochastic capacity degradation model.

In S106, capacity prediction is performed using the trained stochastic capacity degradation model to obtain remaining useful life (RUL) of one or more testing lithium-ion batteries.

In S108, an air mass flow rate and a charging/discharging rate are generated by a controller according to the RUL and a working condition of the one or more testing lithium-ion batteries.

In S110, the air mass flow rate and the charging/discharging rate generated by the controller are inputted into a battery thermal management system (BTMS) to adjust lithium-ion battery temperature.

In one embodiment, the prior knowledge includes that a battery capacity is a positive value and lower than a battery maximum capacity; and the battery capacity monotonically decreases over time.

In one embodiment, the DEKFs includes a top EKF and a bottom EKF which are connected in parallel with each other.

In one embodiment, the ANN is trained using a historical dataset from a baseline battery to capture dynamics of the baseline battery.

In one embodiment, the KRML includes a diagnosis module using the ANN and the DEKFs, and a prognosis module using the integrated knowledge-reinforced Gaussian process regression.

In one embodiment, the working condition of the one or more testing lithium-ion batteries includes a temperature, a charging/discharging profile, and/or a humidity.

According to various embodiments, the knowledge-reinforced machine learning framework for data-driven diagnostics and prognostics of lithium-ion batteries is provided in the present disclosure. The method may employ the neural network model to map the battery fade routine. The SoC and capacity may be estimated through the DEKF algorithm. Then, the knowledge-reinforced Gaussian Process model (i.e., method) may be trained to learn the stochastic degradation of battery capacities.

In various embodiments of the present disclosure, state-space modeling for battery dynamics is described hereinafter.

Figure 2:
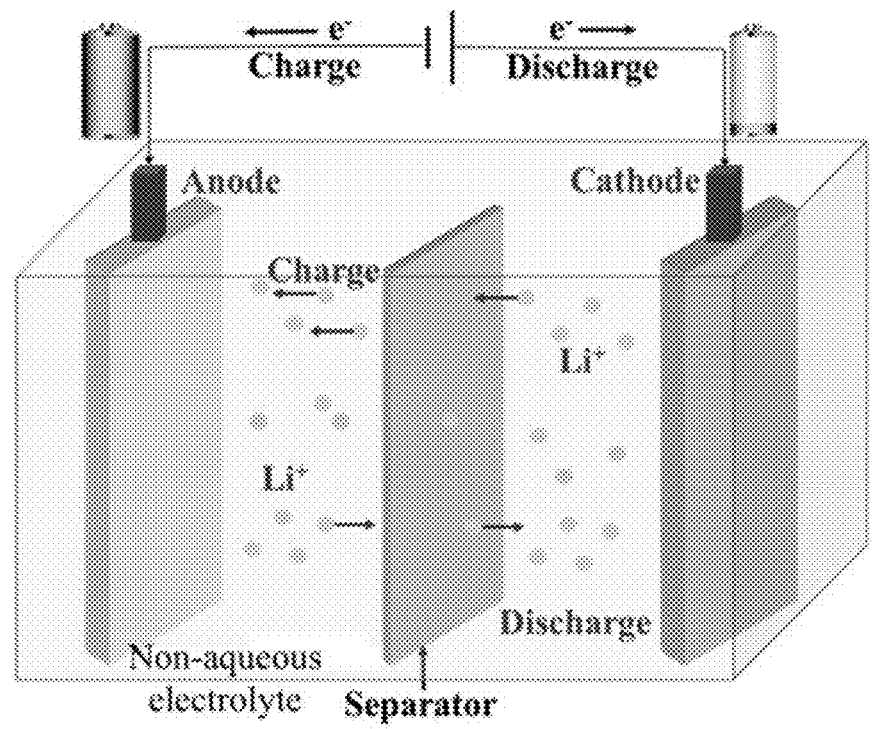
FIG. 2 depicts a schematic of working characteristics of an exemplary lithium-ion battery.

The working principle of a battery may be defined in a concise form as the conversion of chemical energy into electrical energy and vice versa. The conversion is a result of a series of reduction-oxidation reactions or charge transfer reactions. FIG. 2 depicts a schematic of working characteristics of an exemplary lithium-ion battery. Due to a few irreversible chemical and physical changes within the battery, its health/performance tends to deteriorate over its lifetime. These changes, which are observed by a battery management system (BMS) during the operation of the battery, are captured in the form of a dynamic system.

Within the BMS, the SoC parameter is of paramount importance. Accurate estimation of the SoC enables the optimization of battery operations by developing reliable charging/discharging strategies. The SoC is frequently defined as the ratio of available amount of charges ($Q_{available}$) to a rated capacity or nominal capacity ($C_N$), which may be expressed as follows:

$$SoC = \frac{Q_{available}}{C_N} \quad (1)$$

Although equation (1) is a definition of the SoC, it poses problems in practical applications, as the rated capacity is measured through experimental methods under a constant discharging rate in a controlled environment. Hence, for practical applicability of the SoC parameter, the definition of the practical SoC is deployed, which is denoted by $SoC_p$ in embodiments of the present disclosure. $SoC_p$ uses maximum practical capacity ($C_{max.p}$) instead of nominal capacity. Mathematically, practical SoC may be defined as follows:

$$SoC_p = \frac{Q_{avaiable}}{C_{max.p}} \quad (2)$$

Figure 3:
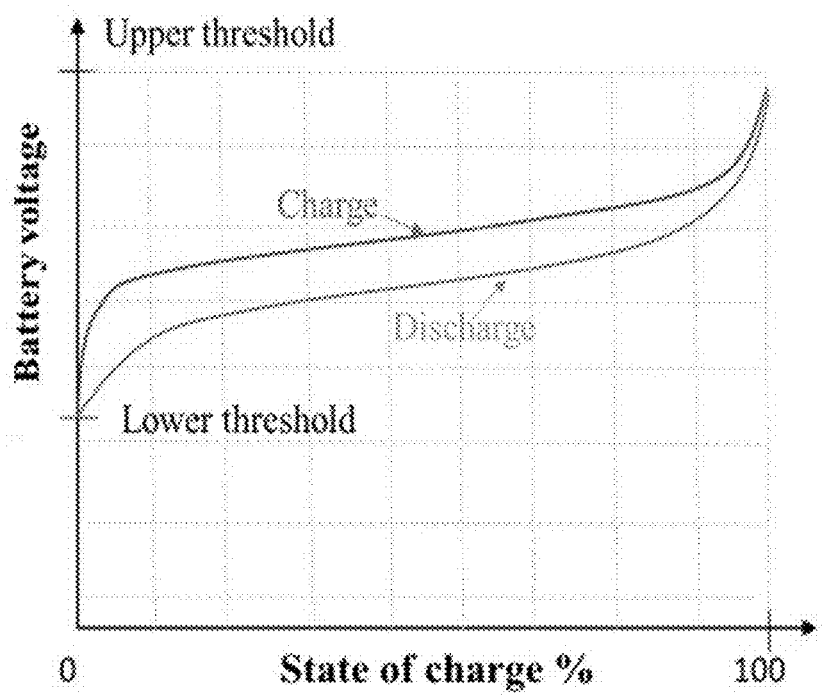
FIG. 3 depicts a schematic of charging/discharging characteristics of an exemplary lithium-ion battery in a cycle.

$C_{max.p}$ measures maximum capacity of an operating battery at current time. FIG. 3 depicts a schematic of charging/discharging characteristics of the SoC with respect to battery voltage for a lithium-ion battery in a cycle.

The SoH characterizes the ability of the battery to store electrical energy relative to the ability of a new battery, which is an indicator that quantitatively describes the state of performance of tested battery. With increase in the number of charging/discharging operations, the SoH shows a downward trend. SoH estimation is not only important as a basis for calculating key parameters such as the SoC, but also a criterion for replacement of the lithium battery. The SoH may provide information on battery capacity, health, performance status, and longevity, which may be defined as follows:

$$SoH = \frac{C_{max.p}}{C_N} \quad (3)$$

Dynamic behavior of the lithium-ion battery depends on factors such as its current, SoC, capacity and voltage. In embodiments of the present disclosure, a knowledge-reinforced machine learning model integrated with a DEKF is provided to learn battery dynamics and predict capacity transitions in the battery. The RUL may be further predicted from estimated capacity transitions.

In various embodiments of the present disclosure, battery system modeling is described herein. The system of battery dynamics may be described as a discrete state-time and state-space model, which may be expressed as follows:

$$\text{Transition } x_k = F(x_{k-1}, u_{k-1}, \theta_{k-1}) + w_k, \theta_k = \theta_{k-1} + r_k \quad (4)$$

$$\text{Measurement } y_k = G(x_k, u_k, \theta_k) + v_k$$

where $x_{k-1}$ denotes a vector of system states, $\theta_{k-1}$ denotes a vector of system model parameters, $u_{k-1}$ denotes a vector of observed inputs, and $y_{k-1}$ denotes a vector of system observations or system measurements. The parameters $w_k$ and $r_k$ denote vectors of process noise for the state and model parameters, respectively while $v_k$ denotes a vector of measurement noise. The functions $F(\cdot)$ and $G(\cdot)$ denote state transition and measurement functions, respectively. With above-mentioned system defined, estimating the system states x and model parameters θ from noisy observations may be proceeded. Mapping above defined model with the dynamic parameters of the battery system, x is referred as the SoC of the battery. The SoC of the battery, which is a volatile parameter, may vary between 100 and 0 percent within minutes. The system model parameter θ represents the cell capacity. The variation in the SoC over time may be modeled using the state transition function $F(\cdot)$, while the function $G(\cdot)$ may be configured to relate the voltage y with the SoC, capacity and measured input u.

Figure 4:
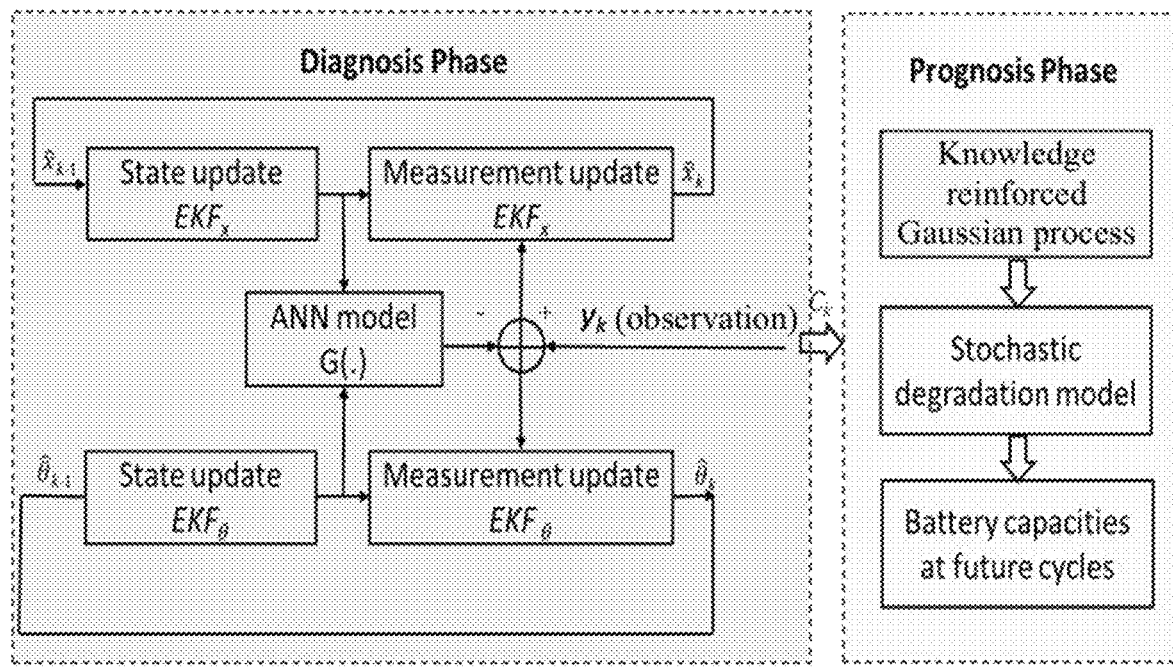
FIG. 4 depicts a schematic of a diagnosis phase and a prognosis phase of an exemplary knowledge-reinforced machine learning framework according to various disclosed embodiments of the present disclosure.

In various embodiments of the present disclosure, prognostics of battery capacity and its KRML framework are described hereinafter. The integration of the DEKF with the ANN is graphically shown in a schematic diagram in FIG. 4. It may be observed that the system may include DEKFs running in parallel and an ANN model, where the top and bottom EKFs may adapt the system states x and system parameters θ while the ANN model may learn the measurement function $G_{NN}(\cdot)$ of the dynamic system. It should be noted that the model parameters of ANN may be adaptively updated based on the DEKFs by continuously collecting data in system operation. By integrating the artificial neural network with the DEKF algorithm for lithium-ion battery online SoC estimation, entire KRML framework may involve training of machine learning models in the offline phase and synchronizing these models with the DEKF techniques in the online phase, which may contain two modules including (1) a diagnosis module (i.e., phase) and (2) a prognosis module (i.e., phase), as illustrated in FIG. 4. The diagnosis phase may provide estimation of the SoC by employing the ANN and DEKFs. The prognosis phase may learn the stochastic degradation model of battery capacity by employing the knowledge-reinforced Gaussian process regression.

In various embodiments of the present disclosure, Kalman filtering-based modeling of battery capacity is described herein. According to embodiments of the present disclosure, the ampere-hour counting approach may be employed to estimate SoC by dynamic integration of the current of the lithium-ion battery. The changes in internal parameters of the battery may not be considered, and SoC may be directly expressed as the integral of the current with respect to time. That is, SoC may be expressed as follows:

$$SoC(t) = SoC(t_0) - \frac{\int_0^t \eta_C I(t) dt}{C_{max.p}} \quad (5)$$

where t denotes time, $C_{max.p}$ denotes maximum practical capacity, $\eta_C$ denotes Coulombic efficiency (for discharge $\eta_C=1$) and I(t) denotes discharge current. The initial $SoC(t_0)$ may be configured to 1 for the discharge cycle in the battery. In discretized form, equation (5) may be rewritten as follows:

$$SoC_k = SoC_{k-1} - \frac{\eta_k * \Delta t}{C_{k-1}} i_{k-1} \quad (6)$$

Equation (6) represents iteration function of SoC, which may form the basis for describing battery dynamics via integration with the state-space model defined by the DEKF. Kalman filters may be sets of equations that provide efficient solutions for estimation of states using the least-squares method. The estimation process may be feasible even when the explicit nature of associated model is unknown. To estimate both SoC and SoH, the dual extended Kalman filter may be employed. In various embodiments of the present disclosure, the state variables and model parameters may be set as x=SoC and θ=C, respectively. The pseudo algorithm of the DEKF is briefly stated herein. In one embodiment, the pseudo algorithm of the DEKF may include following exemplary equations A1-A8.

Initialization may be expressed as follows:

$$\hat{\theta}_0 = E[\theta_0], p = E[(\theta_0 - \theta_0)(\theta_0 - \theta_0)^T] \quad (A.1)$$
$$\hat{x}_0 = E[x_0], p = E[(x_0 - x_0)(x_0 - x_0)^T]$$

For k∈(1, ..., ∞), the state update for the weight filter may be expressed as follows:

$$\hat{\theta}_k^- = \theta_k \quad (A.2)$$
$$p_{\theta_k}^- = p_{\theta_{k-1}} + p_{r_{k-1}}$$

The state update for the state filter may be expressed as follows:

$$\hat{x}_k^- = F(x_{k-1}, u_{k-1}, \hat{\theta}_k^-) \quad (A.3)$$
$$p = A_{k-1} p_{x_{k-1}} A_{k-1}^T + p_{w_{k-1}}$$

The measurement update for the state filter may be expressed as follows:

$$K_k^x = p_{x_k}^- (C_k^x)^T \left[ C_k^x p_{x_k}^- (C_k^x)^T + p_{v_k} \right]^{-1} \quad (A.4)$$
$$\hat{x}_k = x_k^- + K_k^x [y_k - G(x_k^-, u_k, \hat{\theta}_k^-)]$$
$$p_{x_k} = (I - K_k^x C_k^x) p_{x_k}^-$$

The measurement update for the weight filter may be expressed as follows:

$$K_k^\theta = p_{\theta_k}^- (C_k^\theta)^T \left[ C_k^\theta p_{\theta_k}^- (C_k^\theta)^T + p_{v_k} \right]^{-1} \quad (A.5)$$
$$\hat{\theta}_k = \theta_k^- + K_k^\theta [y_k - G(\hat{x}_k^-, u_k, \theta_k^-)]$$
$$p = (I - K_k^\theta C_k^\theta) p_{\theta_k}^-$$

where:

$$A_{k-1} = \left. \frac{\partial F(x, u_{k-1}, \hat{\theta}_k^-)}{\partial x} \right|_{x = \hat{x}_{k-1}} \quad (A.6)$$

$$C_k^x = \left. \frac{\partial G(x, u_{k-1}, \hat{\theta}_k^-)}{\partial x} \right|_{x = \hat{x}_k} \quad (A.7)$$

$$C_k^\theta = \left. \frac{\partial G(x, u_{k-1}, \hat{\theta}_k^-)}{\partial x} \right|_{\theta = \hat{\theta}_{k-1}} \quad (A.8)$$

By integrating the state-space model in equation (4) with equation (6), the stochastic capacity degradation model may be defined as follows:

$$\text{Transition} \begin{cases} x_k = F(x_{k-1}, u_{k-1}, \theta_{k-1}) + w_{k-1} = x_{k-1} - \frac{\eta_C * \Delta t}{C_{k-1}} i_{k-1} \\ C_k = C_{k-1} + r_{k-1} \end{cases} \quad (7)$$

$$\text{Measurement } y_k = G(x_k, u_k, \theta_k) + v_k \approx G_{NN}(x_k, i_k, C_k) + v_k$$

where $G_{NN}(\cdot)$ denotes measurement function derived from the ANN model. By integrating the ANN-based DEKF with knowledge-reinforced Gaussian process modeling described above, the stochastic degradation behavior of lithium-ion batteries may be learned effectively and configured to predict the remaining useful life of battery capacity.

Figure 5:
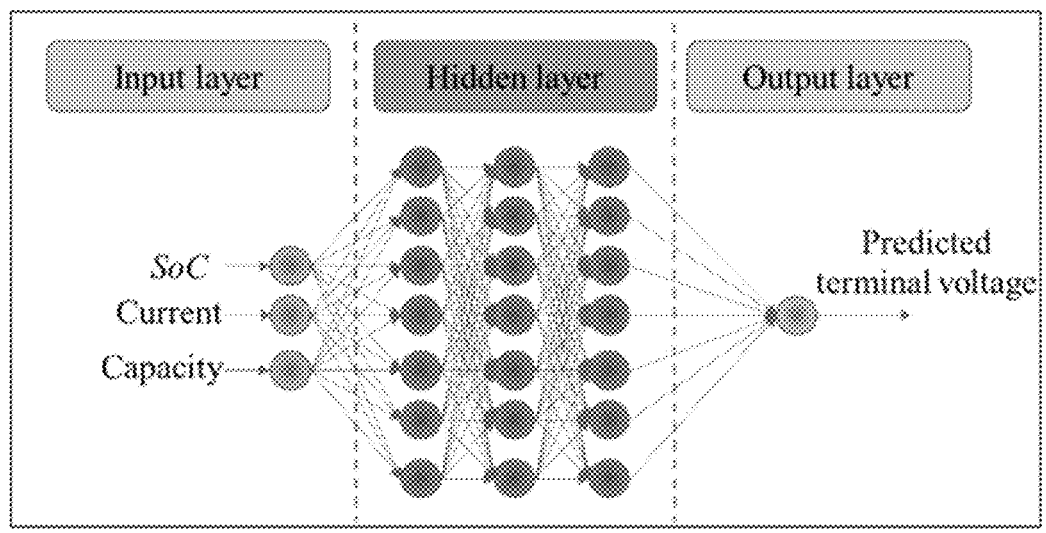
FIG. 5 depicts a structural schematic of an exemplary artificial neural network (ANN) according to various disclosed embodiments of the present disclosure.

In various embodiments of the present disclosure, artificial neural network for battery system modeling is described herein. ANNs have been widely employed in various fields for applications such as optimization, function approximation, image processing and the like. As shown in FIG. 5, the ANN model, including an input layer, three hidden layers, and an output layer, may be configured to simulate complex dynamics of lithium-ion batteries. The numbers of neurons in the input and output layers may be determined by the physical system, where the number of neurons in the hidden layer may be predefined to reduce computational complexity and enhance network accuracy. A logistic function may be employed as the activation function between the layers of the ANN, which may be expressed as follows:

$$\varphi(t) = \frac{1}{1 + e^{-\beta t}} \quad (8)$$

where β denotes a slope parameter. The network output may include the battery voltage, and the network inputs may include SoC (k), current I(k) and capacity (k) (maximum practical capacity). Therefore, the input vector may be defined as $q_k = [\hat{x}_k^-, i_k, \hat{C}_k^-]$, where k denotes a time step. The values of the hidden layer may be calculated based on the activation function as follows:

$$h_k^j = \varphi\left(\sum_{i=1}^{I} q_k^i a_k^{ij} + a_k^{0,j}\right) \quad (9)$$

where i denotes an index of an $i^{th}$ input node, j denotes an index of a $j^{th}$ hidden node, $a_k^{ij}$ denotes a weight connecting the $i^{th}$ input node and the $j^{th}$ hidden node at time step k, and $a_k^{0,j}$ denotes a bias of the $j^{th}$ hidden node at time step k. Similarly, the output of the ANN model may be calculated as follows:

$$z_k = \varphi\left(\sum_{j=1}^{J} h_k^j b_k^j + b_k^0\right) \quad (10)$$

where $b_k^j$ denotes a weight connecting the $j^{th}$ hidden node with the output node at time step k, and $b_k^0$ denotes a bias of the output node at time step k. According to equations (9) and (10), the voltage may be obtained as follows:

$$V_k = \varphi\left(\sum_{j=1}^{J}\left(\sum_{i=1}^{I} q_k^i a_k^{ij} + a_k^{0,j}\right) b_k^j + b_k^0\right) \quad (11)$$

The ANN may be further integrated with DEKF for enhanced SoC prediction. The ANN model is nonlinear, so that for iterative purposes, the linearization of the ANN model may be needed.

In various embodiments of the present disclosure, knowledge-reinforced machine learning for battery prognostics is described herein. With the battery capacities estimated by the DEKF in embodiments of the present disclosure, the knowledge-reinforced Gaussian process regression (GP) method may be configured to train the stochastic capacity degradation model. GP is a powerful tool for Bayesian nonparametric function estimation. One of main advantages of GP is that the prediction interpolates the observation, and the prediction is probabilistic, so that the predictions by GP method (i.e., GP model) may be computed in empirical confidence intervals. To enhance accuracy of RUL prediction, in embodiments of the present disclosure, prior knowledge in battery capacity degradation may be integrated with the GP method to predict the RUL while reducing prediction uncertainty. The prior knowledge may include: 1) the battery capacity should be a positive value and lower than the battery maximum capacity, and 2) the battery capacity should be a monotonic decreasing function over time. Leveraging the prior knowledges as constraints in machine learning processes may enhance accuracy of the capacity prediction and reduce uncertainty of the RUL prediction.

Various models have been developed for reinforced Gaussian process regression. The constraints may be linear operators, which may be written as single linear operators. Let f~GP(m(x), K(x, x')) is a GP with mean m(x) and covariance function K(x, x'), which may be expressed as follows:

$$m(x) = E[f(x)] \quad (12)$$

$$k(x, x') = E[(f(x) - m(x))(f(x') - m(x'))] \quad (13)$$

With the mean and covariance functions, the GP may be denoted as follows:

$$f(x) \sim GP(m(x), k(x, x')) \quad (14)$$

With a set of training data, the degradation model using Gaussian process regression may be trained to predict response as a Gaussian distribution at any new sampling location x*, which is expressed as follows:

$$f(x*) = N(\mu(x*), \sigma(x*)) \quad (15)$$

With a set of observations $y=\{y_i\}_{i=1}^N$ and the test locations $y=\{y_i^*\}_{i=1}^M$, the joint distribution may be expressed as follows:

$$\begin{bmatrix} y \\ y* \end{bmatrix} \sim N\left(0, \begin{bmatrix} K_X & K(X, X*) \\ K(X*, X) & K(X*, X*) \end{bmatrix}\right) \quad (16)$$

where K (X', X'') denotes a covariance matrix, X and X* denote the training and testing locations, respectively, and $K_X = K(X, X) + \sigma_n^2 I$. The predictive distribution over the test locations may be given by:

$$y* | X, y, X* \sim N(\mu*, \Sigma*) \quad (17)$$

$$\mu* = K(X*, X)K_X^{-1} y \quad (18)$$

$$\Sigma* = K(X*, X*) - K(X*, X)K_X^{-1} K(X, X*) \quad (19)$$

Furthermore, for each test location $x* \in X*$, the response may be predicted by the GP as a normal distribution with mean and variance, which may be expressed as follows:

$$\mu(x*) = K(x*, X)K_X^{-1} y \quad (20)$$

$$\sigma(x*) = K(x*, x*) - K(x*, X)K_X^{-1} K(X, x*) \quad (21)$$

In various embodiments of the present disclosure, the battery working cycles and working condition (e.g., temperature) X and capacities Y represent N observations as training pairs. To make sure that the predictions of battery capacities by the GP are within a certain range, two functions may be formulated, such that $a(x) \leq Lf(x) \leq b(x)$, where L denotes a linear operator on the implementation of Gaussian process. To enforce the upper and lower bounds for the GP modeling, it is assumed that the constraint may only hold at a finite set of virtual observation locations $X^v$. In addition, it is assumed that virtual observations of the transformed process, Lf(x), may contain additive white noise with variance $\sigma_v^2$. Let $C*(X^v)$ represents the matrix with rows $(C*(X^v))_i = Lf(x^v_i) + \varepsilon^v_i$ for i.i.d. (i.e., independent identical distribution) where $\varepsilon^v_i \sim N(0, \sigma_v^2 I)$, and let C $(X^v)$ denotes the event $C(X^v) := \cap_{i=1}^S \{a(x^v_i) \leq (C(X^v))_i \leq b(x^v_i)\}$, where S denotes a number of virtual observation locations. $C(X^v)$ represents the function where the constraint $a(X^v) \leq Lf(X^v) + \varepsilon^v \leq b(X^v)$ is satisfied for the virtual locations $X^v$. With the upper and lower bounds as constraints, the GP may be reformulated as follows:

$$f | X, Y, X^v, C(X^v) := f | f(X) + \varepsilon, a(X^v) \leq Lf(X^v) + \varepsilon^v \leq b(X^v) \quad (22)$$

where f denotes a Gaussian process, X and Y denote the training data including working cycles and battery capacities estimated by the DEKF, and $X^v$ denotes virtual locations where $Lf(X^v) + \varepsilon^v$ is bounded. a(X) and b(X) may be determined by the lower and upper bounds of battery capacities. The additive noise $\varepsilon$ and $\varepsilon^v$ may be multivariate Gaussian with diagonal covariance matrices of elements $\sigma^2$ and $\sigma v^2$ respectively.

To predict the battery capacity for future working cycles, the posterior predictive distribution $f*|X*, X, Y, X^v, C(X^v)$ may be obtained for new inputs X* conditioned on the observed data $Y = f(X) + \varepsilon$ and the constraint $a(X^v) \leq Lf(X^v) + \varepsilon^v \leq b(X^v)$. The posterior predictive distribution may be then expressed as follows:

$$\begin{cases} p(f*, C | Y) = p(f* | C, Y)p(C | Y) \\ p(f* | C, Y) = \int_{a(X^v)}^{b(X^v)} p(f* | C*, Y)p(C* | Y)dC* \end{cases} \quad (23)$$

where C* denotes a latent variable, p(C|Y) denotes the probability that the constraints hold for the virtual locations $X^v$.

For battery degradation modeling, it is assumed that the battery capacity decreases monotonically over the working cycles. Similarly, a set of virtual points may be utilized to enforce the monotonicity constraint while developing data-driven battery degradation models. In one embodiment, by treating partial derivatives as GPs with covariance kernel functions, the monotonicity constraint may be realized by enforcing at a discrete set of S virtual points, which may be expressed as follows:

$$\frac{\partial f}{\partial x}(x_i) \leq 0, i = 1, \ldots, S \quad (24)$$

Then, with estimated battery capacity data for training purpose, the predictor of the battery capacity for following working cycles may be obtained by maximizing marginal likelihood function, which may be expressed as follows:

$$LF(\theta) = p(Y, C \mid \theta) = p(Y \mid \theta) p(C \mid Y, \theta) \quad (25)$$

where $\theta$ denotes a vector of trainable parameters of knowledge-reinforced GP. It should be noted that disclosed method may adaptively learn complex battery degradation by continuously observing new online monitoring data. In the online phase, the diagnostics may be employed to estimate the battery capacity from online operating signals, and estimated online capacity data may be added as additional training data to update the knowledge-reinforced GP. As more online diagnostic estimations are added to update the knowledge-reinforced GP, the knowledge-reinforced GP may map capacity transition more comprehensively, and prediction capability of the model may become increasingly accurate.

The linearization procedure of the ANN model is described herein. According to various embodiments of the present disclosure, recursive routine derivative computation may include following exemplary equations B.1-B.12.

From equation (18), the following equation may be obtained:

$$A_k = \frac{\partial F(x, u, \theta)}{\partial x} \Big|_{} = 1 \quad (B.1)$$

By setting $q^1 = SoC$, the following equations may be obtained:

$$C_k^x = \frac{\partial G(x, u_k, \hat{\theta}_k^-)}{\partial q_k^1} = \frac{\partial V_k}{\partial q_k^1} = z_k(1 - z_k) \sum\nolimits_{j=1}^{J} b_k^j h_k^j (1 - h_k^j) a_k^{1j} \quad (B.2)$$

$$C_k^\theta = \frac{dG(\hat{x}_k^-, u_k, \theta)}{d\theta} = \frac{\partial G(x_k^-, u_k, \theta)}{\partial \theta} + \frac{\partial G(x_k^-, u_k, \theta)}{\partial \hat{x}_k^-} \frac{d\hat{x}_k^-}{d\theta} \quad (B.3)$$

$$\frac{d\hat{x}_k^-}{d\theta} = \frac{\partial F(\hat{x}_{k-1}, u_{k-1}, \theta)}{\partial \theta} + \frac{\partial F(x_{k-1}, u_{k-1}, \theta)}{\partial \hat{x}_{k-1}} \frac{dx_{k-1}}{d\theta} \quad (B.4)$$

$$\frac{d\hat{x}_{k-1}}{d\theta} = \frac{d\hat{x}_{k-1}^-}{d\theta} - K_{k-1}^x \frac{dG(\hat{x}_{k-1}^-, u_{k-1}, \theta)}{d\theta} + \frac{\partial K_{k-1}^x}{\partial \theta} [y_k - G(\hat{x}_{k-1}^-, u_{k-1}, \theta)] \quad (B.5)$$

By setting $q^3 = C$, the following equations may be obtained:

$$\frac{\partial F(\hat{x}_{k-1}^-, u_{k-1}, \theta)}{\partial \theta} = \left[ -\frac{\eta \Delta t}{C^2} i_{k-1, 0, \ldots, 0} \right]^T \quad (B.6)$$

$$\frac{\partial G(\hat{x}_k, u_k, \theta)}{\partial \theta} = \left[ \frac{\partial V_k}{\partial q_k^3}, \frac{\partial V_k}{\partial a_k^{ij}}, \frac{\partial V_k}{\partial a_k^{oj}}, \frac{\partial V_k}{\partial b_k^j}, \frac{\partial V_k}{\partial b_k^0} \right], \quad (B.7)$$

$$(i = 1, \ldots, I; j = 1, \ldots, J)$$

$$\frac{\partial V_k}{\partial q_k^3} = z_k(1 - z_k) \sum\nolimits_{j=1}^{J} b^j h_k^j (1 - h_k^j) a_k^{3j} \quad (B.8)$$

$$\frac{\partial V_k}{\partial a_k^{ij}} = \frac{\partial z_k}{\partial h_k^j} \frac{\partial h_k^j}{\partial a_k^{ij}} = z_k(1 - z_k) b_k^j \frac{\partial h_k^j}{\partial a_k^{ij}} = z_k(1 - z_k) b_k^j h_k^j (1 - h_k^j) a_k^i \quad (B.9)$$

$$\frac{\partial V_k}{\partial a_k^{oj}} = \frac{\partial z_k}{\partial a_k^{oj}} = \frac{\partial z_k}{\partial h_k^j} \frac{\partial h_k^j}{a_k^{oj}} = \quad (B.10)$$

$$z_k(1 - z_k) b_k^j \frac{\partial h_k^j}{a_k^{oj}} = z_k(1 - z_k) b_k^j h_k^j (1 - h_k^j)$$

$$\frac{\partial V_k}{\partial b_k^j} = \frac{\partial z_k}{\partial b_k^j} = z_k(1 - z_k) h_k^j \quad (B.11)$$

$$\frac{\partial V_k}{\partial b_k^0} = \frac{\partial z_k}{\partial b_k^0} = z_k(1 - z_k) \quad (B.12)$$

Equations B.4-B.12 may be substituted into equation B.3 to compute $C_k^\theta$.

In various embodiments of the present disclosure, case study results are used to demonstrate the method for diagnostics and prognostics of lithium-ion batteries. The battery experimental dataset is provided by the Prognostics Center of Excellence in NASA. A set of lithium-ion batteries (#5, 6 and 7) were run through 3 different operational profiles (charge, discharge and impedance) at room temperature. Charging was carried out in a constant current (CC) mode at 1.5 A until the battery voltage reached 4.2 V and then continued in a constant voltage (CV) mode until the charge current dropped to 20 mA. Discharge was carried out at a constant current (CC) level of 2 A until the battery voltage fell to 2.7 V, 2.5 V, and 2.2 V for batteries 5, 6 and 7, respectively. Impedance measurement was carried out through an electrochemical impedance spectroscopy (EIS) frequency sweep from 0.1 Hz to 5 k Hz. Repeated charge and discharge cycles result in accelerated aging of the batteries while impedance measurements provide insight into the internal battery parameters that change as aging progresses. The experiments were stopped when the batteries reached end-of-life (EOL) criteria, which was a 30% fade in rated capacity (from 2 Ahr to 1.4 Ahr). As capacity was measured only in discharge cycles, the discharge dataset may be utilized for prognostics of lithium-ion batteries capacities in various embodiments of the present disclosure. To validate above-mentioned method, the dataset of battery 05, including 138 discharge cycles and 44501 sample points, may be utilized for training, and datasets of batteries 06 and 07 may be used for validation.

According to various embodiments of the present disclosure, the inputs of the ANN may be battery SoC, capacity, and current; and the output may be the battery terminal voltage. With the dataset collected from the baseline lithium-ion battery, the ANN may be trained, and final weights matrix obtained from the ANN model may describe complex interactions within batteries. It should be noted that the weights and bias of the ANN model may be updated iteratively using the DEKF to handle batch to batch variations between lithium-ion batteries.

Figure 6:
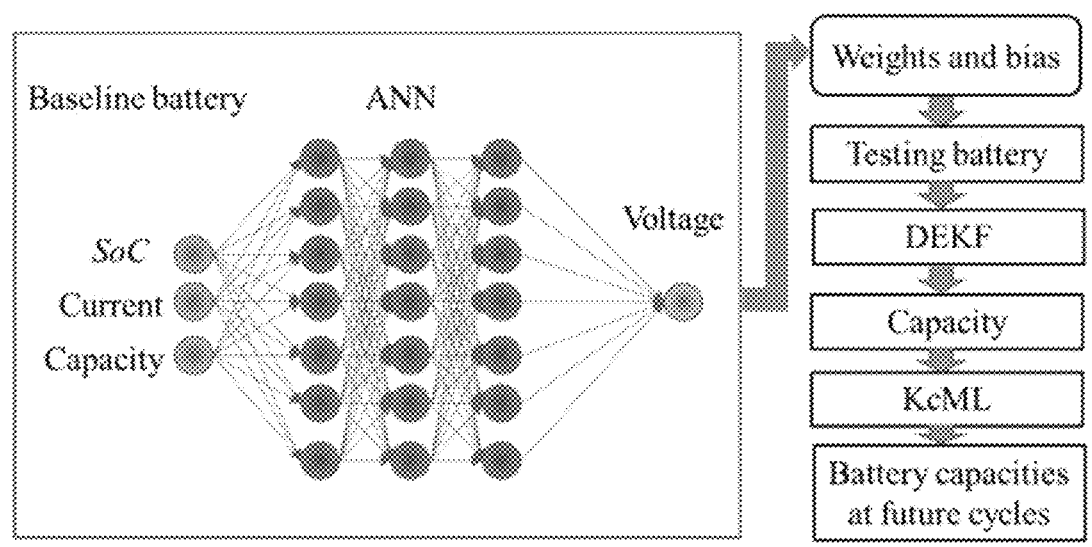
FIG. 6 depicts an exemplary connection of the ANN, dual extended Kalman filter (DEKF) and knowledge-reinforced Gaussian process (GP) method according to various disclosed embodiments of the present disclosure.

With the battery capacities estimated by the DEKF in real time, the knowledge-reinforced machine learning method may construct the GP method to predict the stochastic degradation of battery capacities under different working conditions such as charging/discharging rate and temperature. The connection of the ANN, DEKF and knowledge-reinforced GP method is illustrated in FIG. 6. The stochastic degradation model may be adaptively updated by adding more data to improve accuracy for the capacity prognostic of lithium-ion batteries and reduce prediction uncertainty. To make comprehensive comparison, existing GP and knowledge-reinforced GP methods may be implemented, based on same set of data, to predict the capacity of lithium-ion batteries. With initial ANN model trained based on the dataset extracted from the battery 05, the knowledge-reinforced machine learning framework may be utilized to perform online health monitoring and prognostics of battery 06. With the DEKF algorithm, the battery capacity and state of the charge may be captured in real time, which allows development of the stochastic degradation model for the projection of battery capacity over cycles. The existing GP regression may be first utilized to build the mapping relationship between the number of working cycles and the battery capacities. Then, the knowledge-reinforced machine learning method may be employed to enforce the prior knowledge in development of machine learning models which may reduce prediction uncertainty and increase accuracy for the prognosis of battery capacities.

Figure 7:
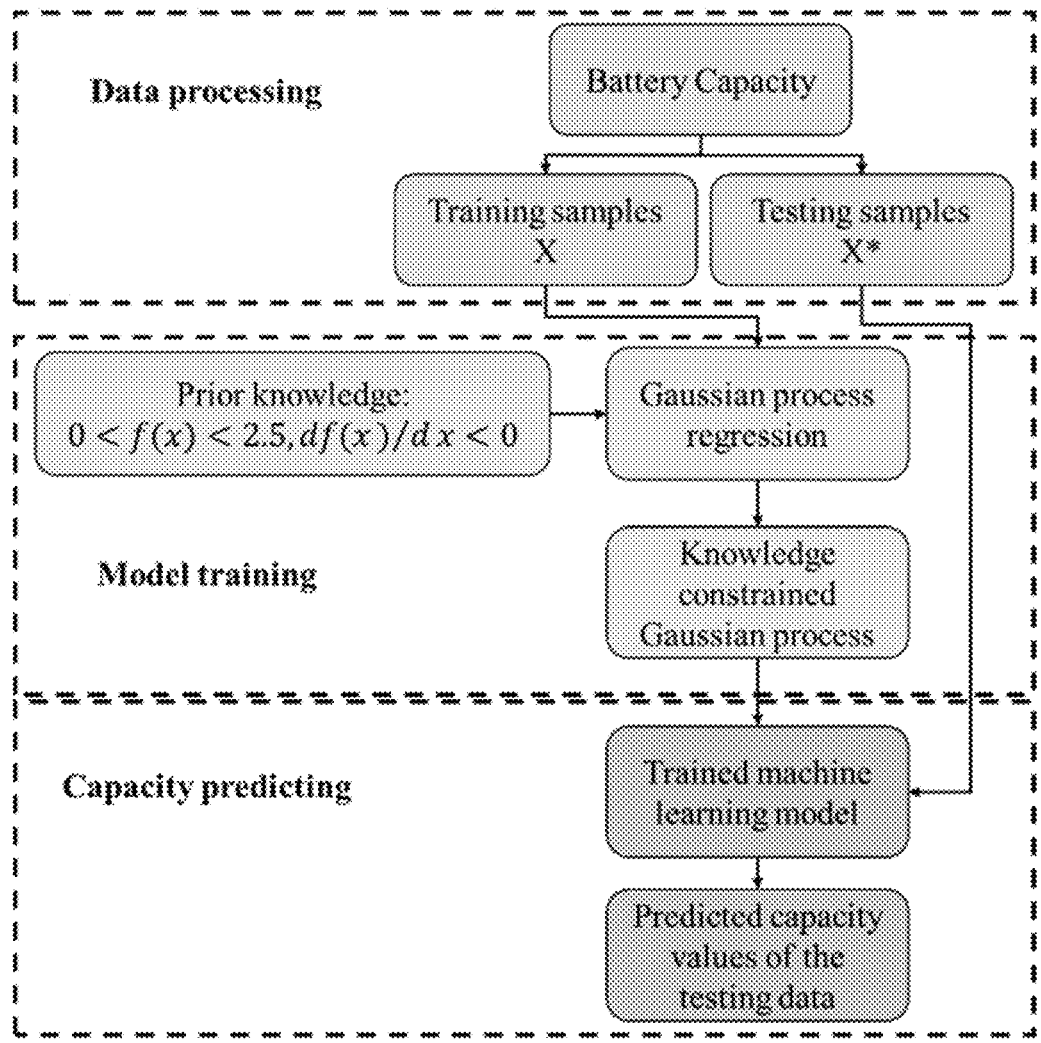
FIG. 7 depicts an exemplary capacity prediction framework according to various disclosed embodiments of the present disclosure.
Figure 8A:
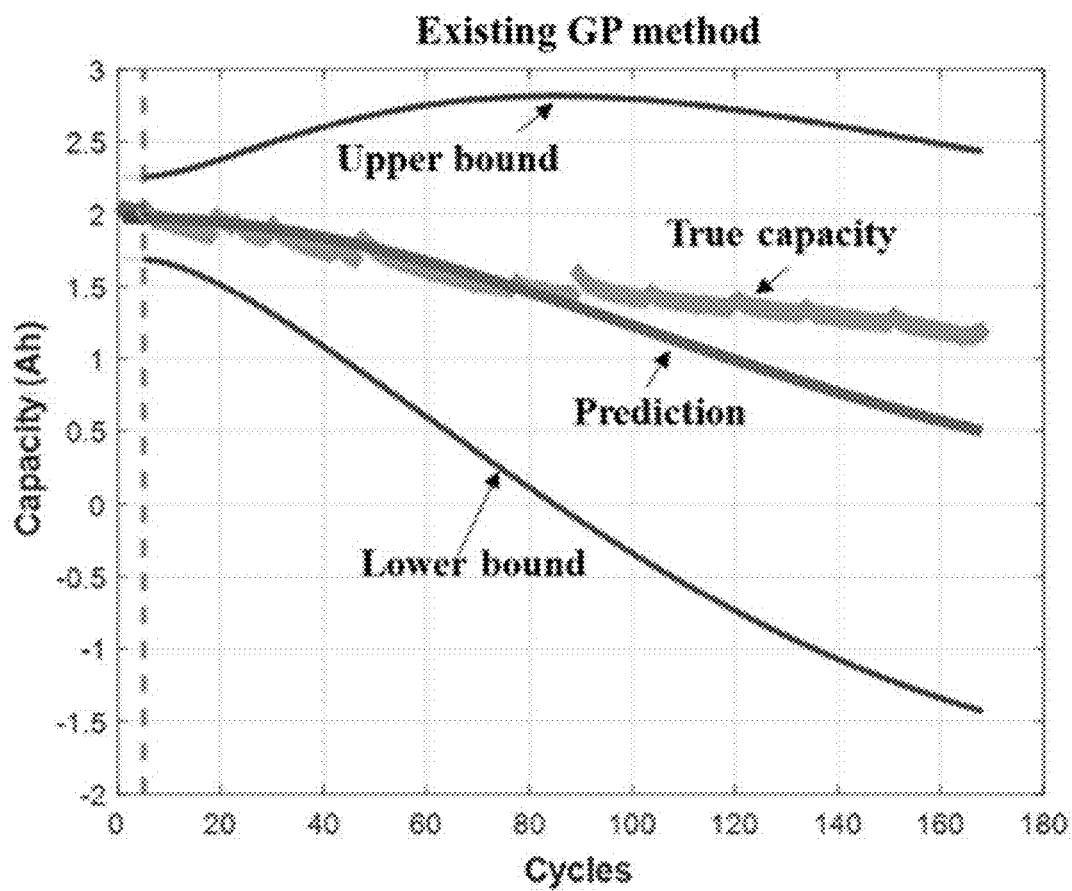
FIG. 8A depicts exemplary capacity prognosis of battery 06 at cycle 5 using an existing GP method according to various disclosed embodiments of the present disclosure.
Figure 8B:
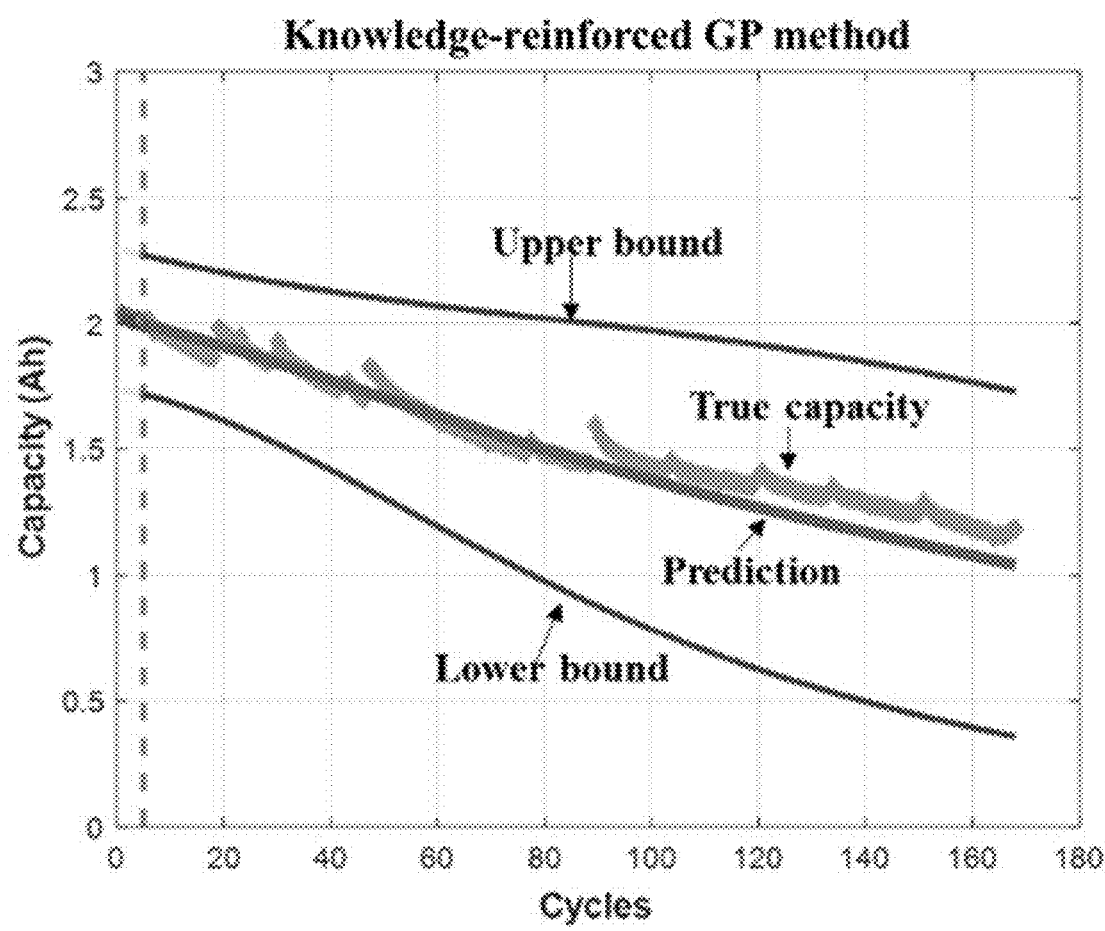
FIG. 8B depicts exemplary capacity prognosis of battery 06 at cycle 5 using a knowledge-reinforced GP method according to various disclosed embodiments of the present disclosure.
Figure 8C:
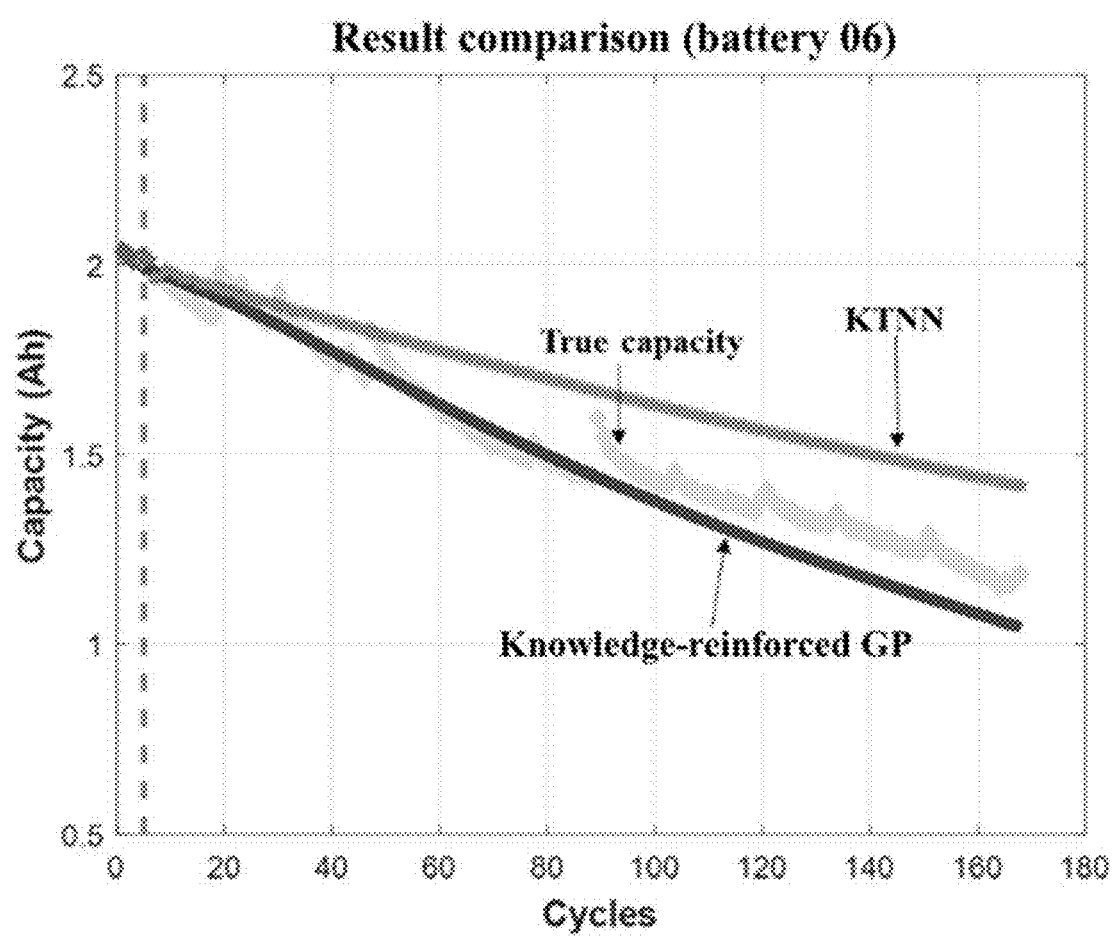
FIG. 8C depicts result comparison of capacity prognosis of battery 06 at cycle 5 between a knowledge-reinforced GP method and a KTNN method according to various disclosed embodiments of the present disclosure.
Figure 9A:
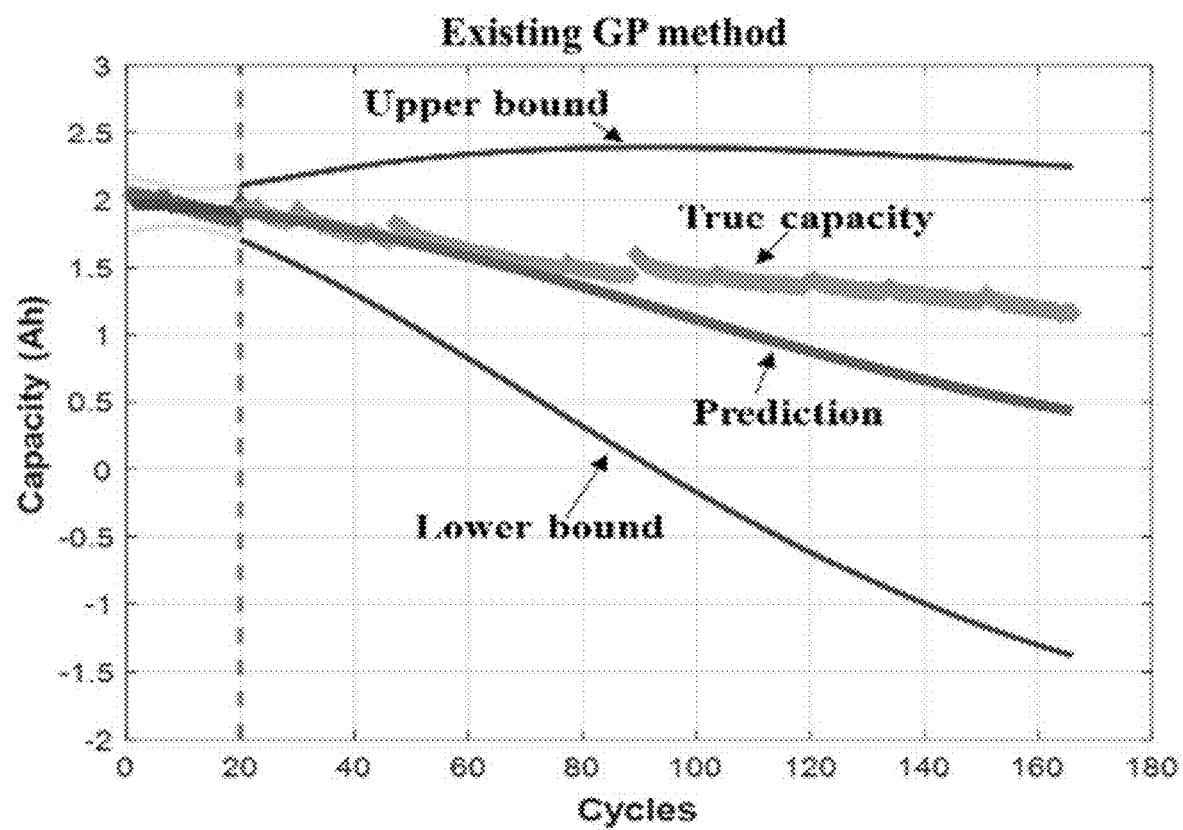
FIG. 9A depicts exemplary capacity prognosis of battery 06 at cycle 20 using an existing GP method according to various disclosed embodiments of the present disclosure.
Figure 9B:
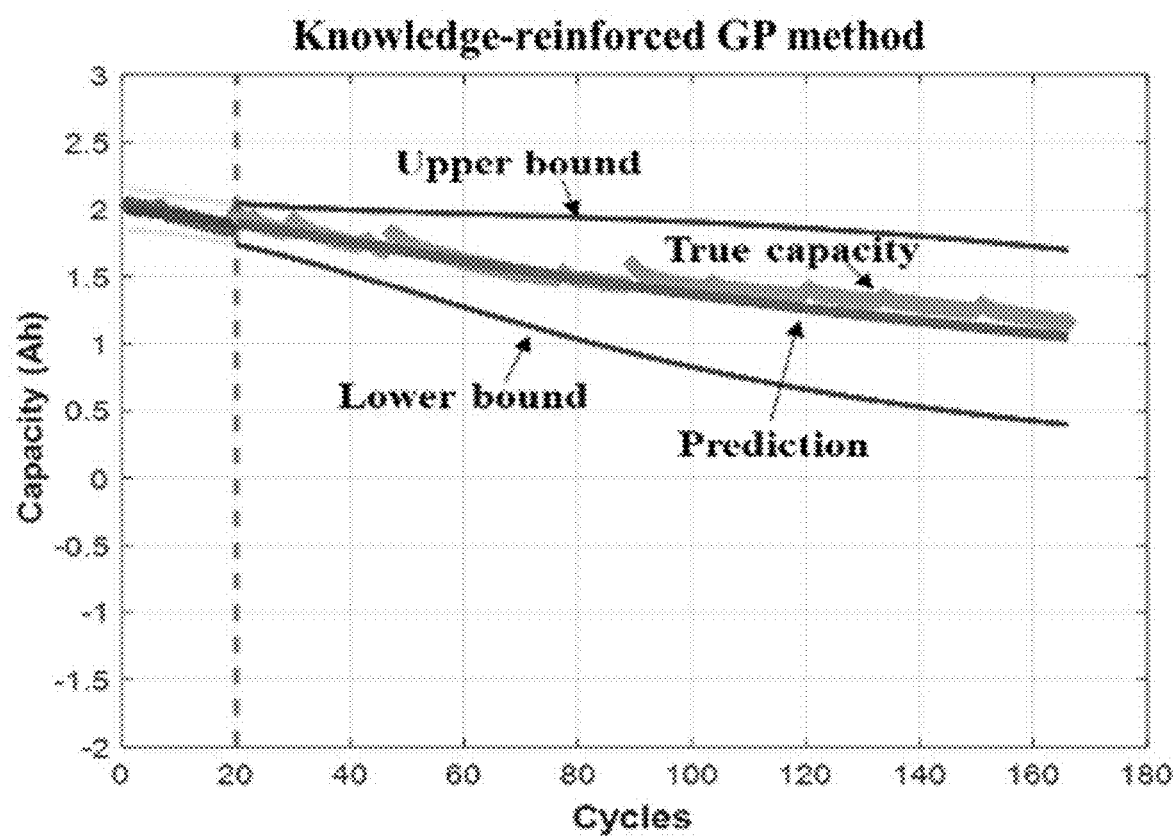
FIG. 9B depicts exemplary capacity prognosis of battery 06 at cycle 20 using a knowledge-reinforced GP method according to various disclosed embodiments of the present disclosure.
Figure 9C:
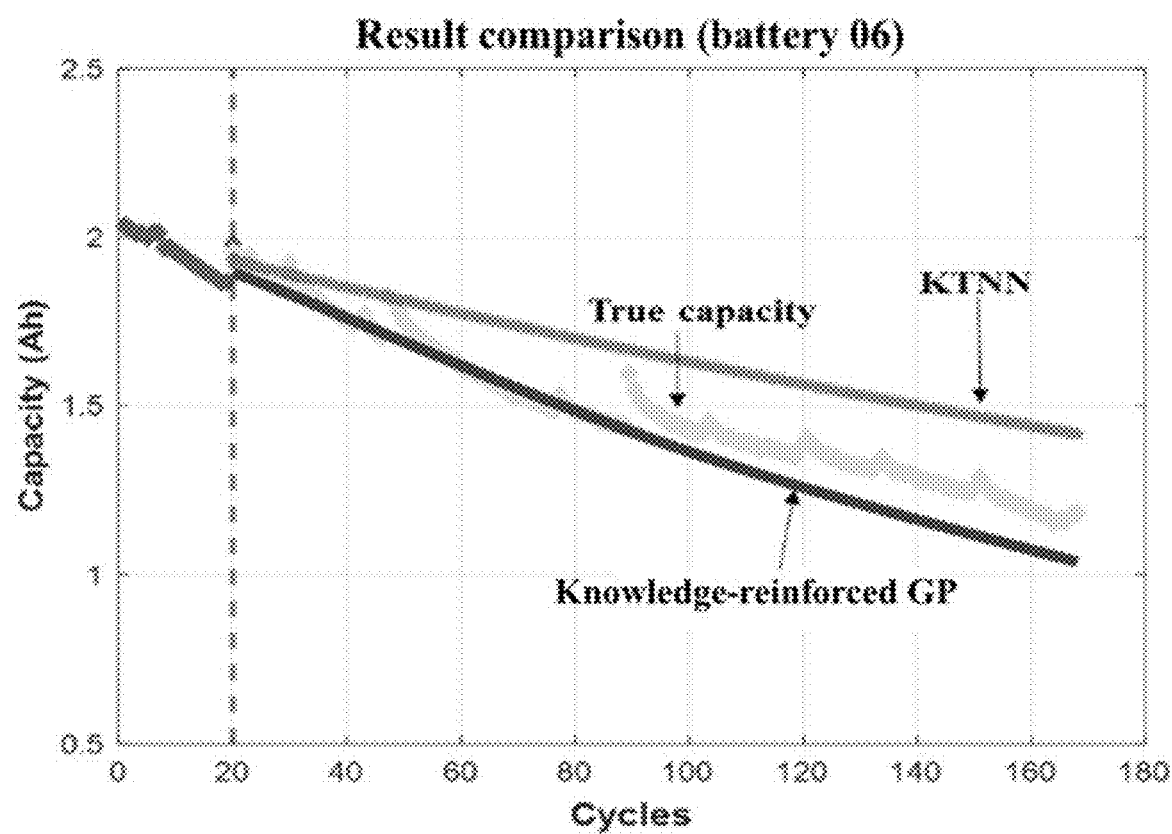
FIG. 9C depicts result comparison of capacity prognosis of battery 20 at cycle 5 between a knowledge-reinforced GP method and a KTNN method according to various disclosed embodiments of the present disclosure.
Figure 10A:
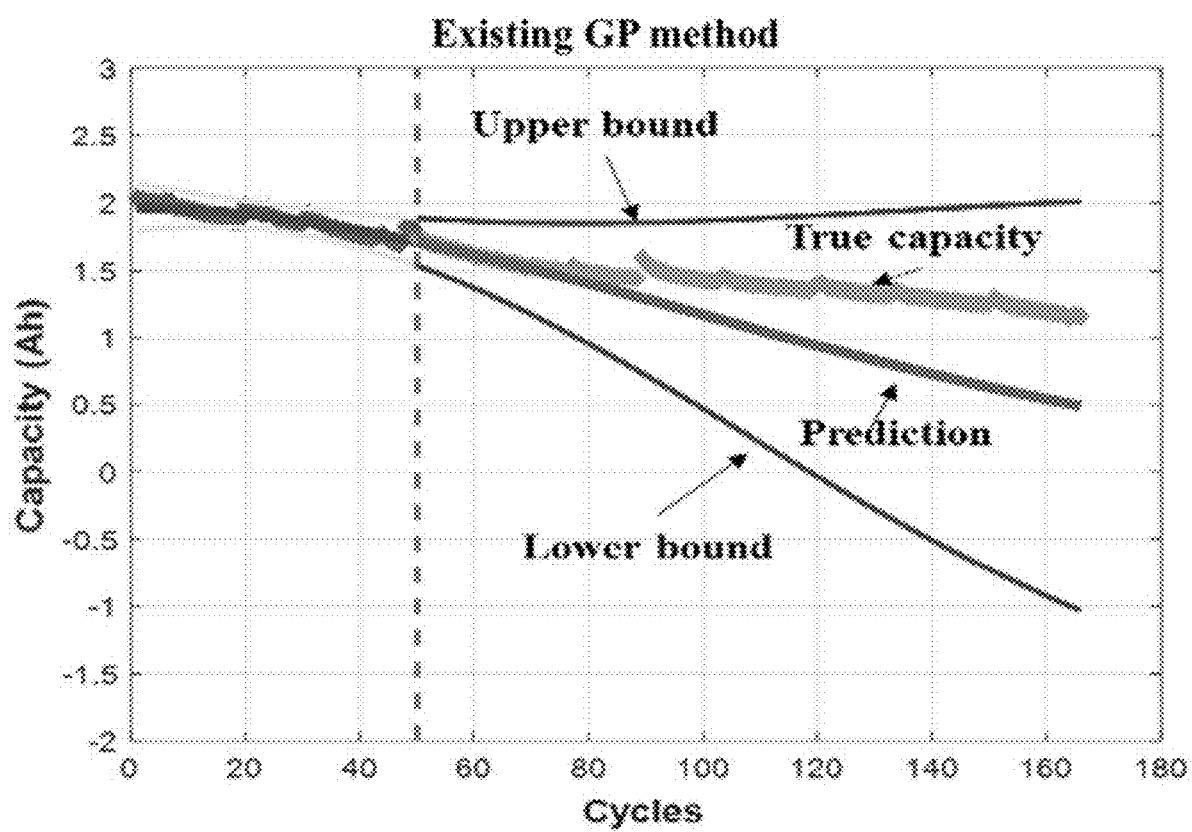
FIG. 10A depicts exemplary capacity prognosis of battery 06 at cycle 50 using an existing GP method according to various disclosed embodiments of the present disclosure.
Figure 10B:
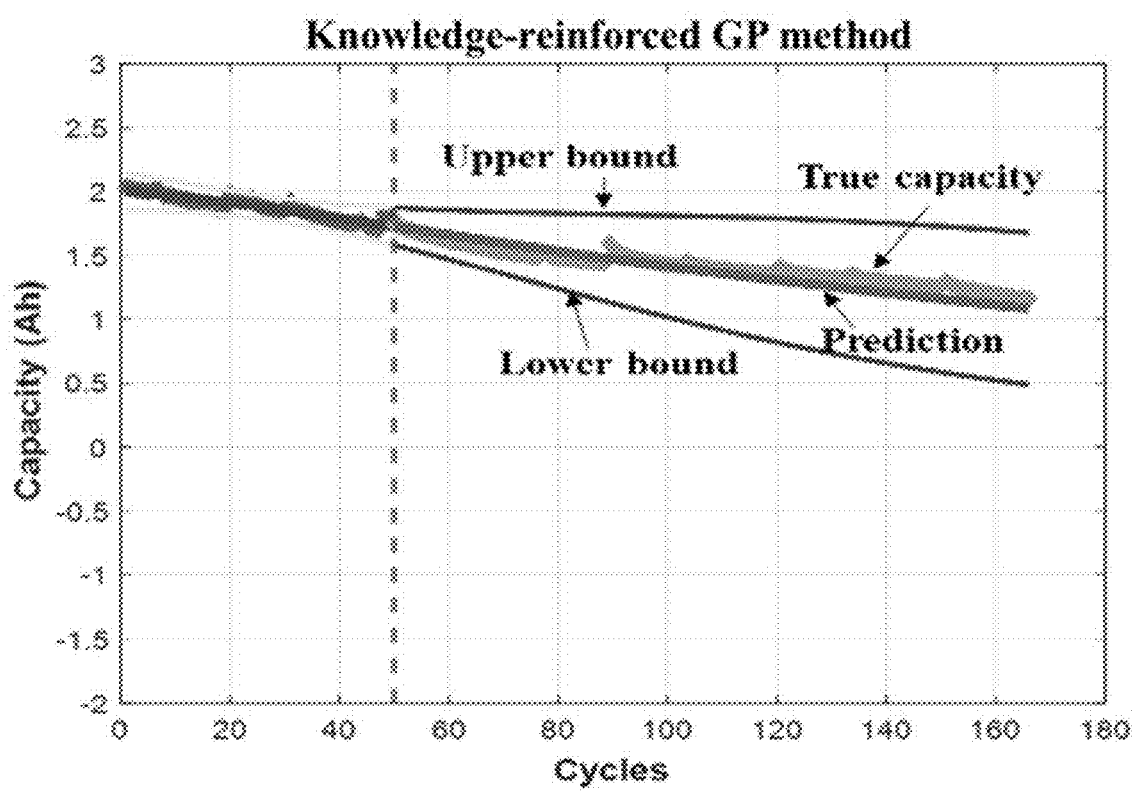
FIG. 10B depicts exemplary capacity prognosis of battery 06 at cycle 50 using a knowledge-reinforced GP method according to various disclosed embodiments of the present disclosure.
Figure 10C:
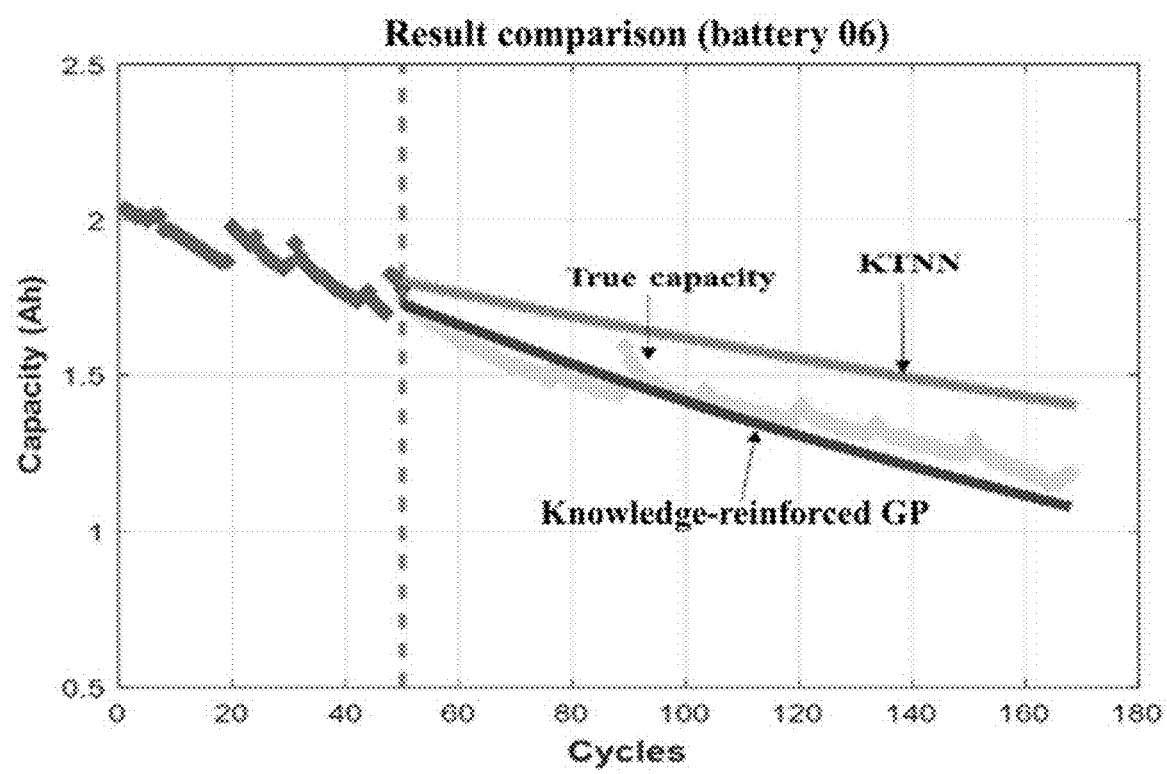
FIG. 10C depicts result comparison of capacity prognosis of battery 50 at cycle 5 between a knowledge-reinforced GP method and a KTNN method according to various disclosed embodiments of the present disclosure.
Figure 11A:
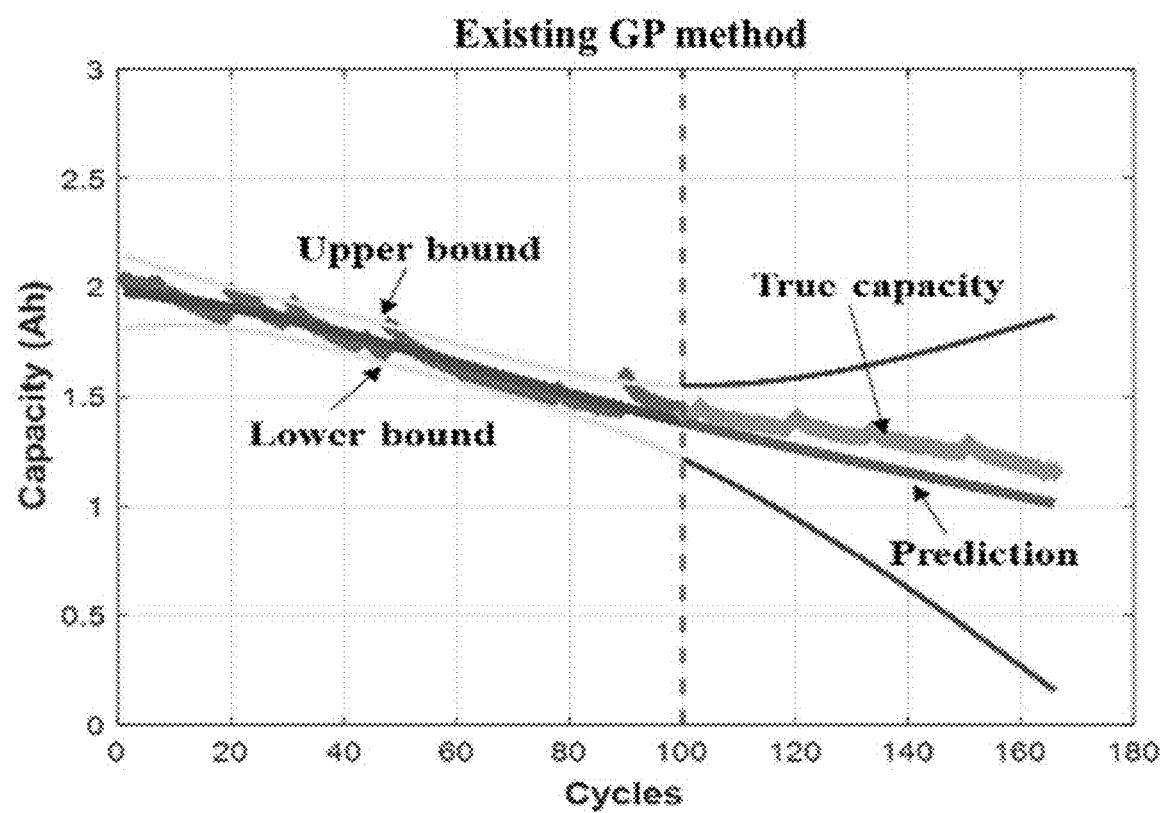
FIG. 11A depicts exemplary capacity prognosis of battery 06 at cycle 100 using an existing GP method according to various disclosed embodiments of the present disclosure.
Figure 11B:
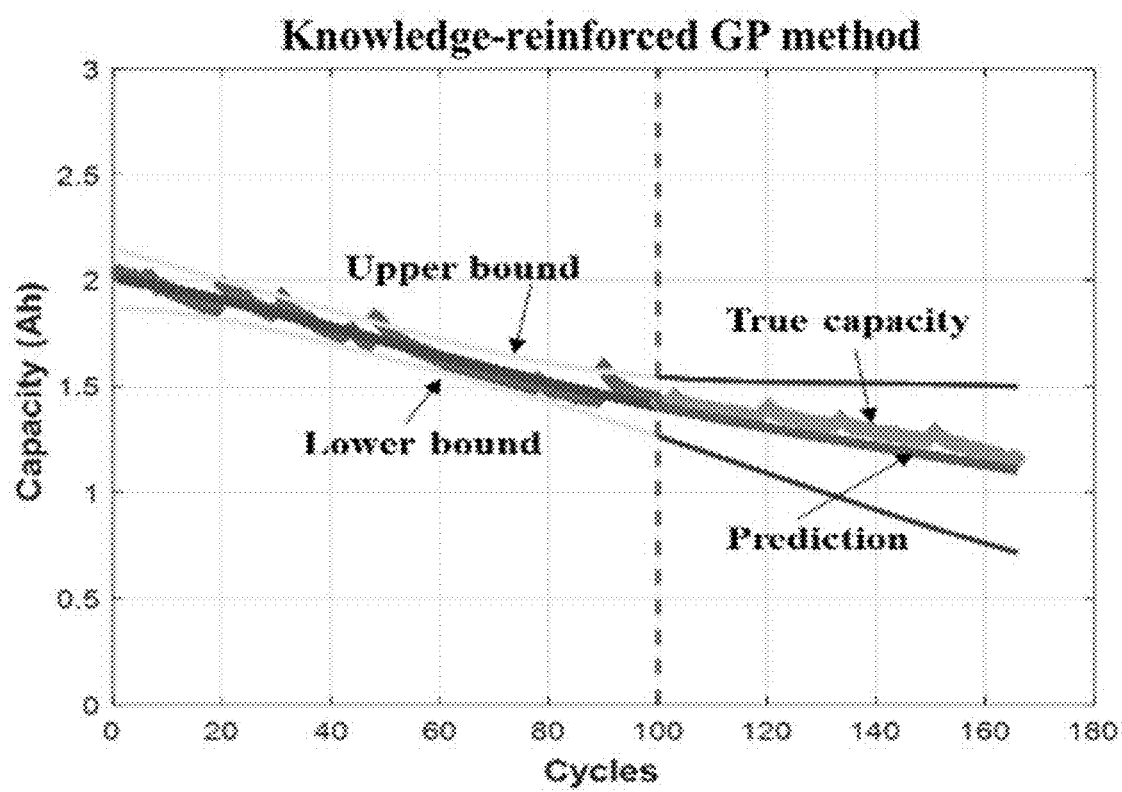
FIG. 11B depicts exemplary capacity prognosis of battery 06 at cycle 100 using a knowledge-reinforced GP method according to various disclosed embodiments of the present disclosure.
Figure 11C:
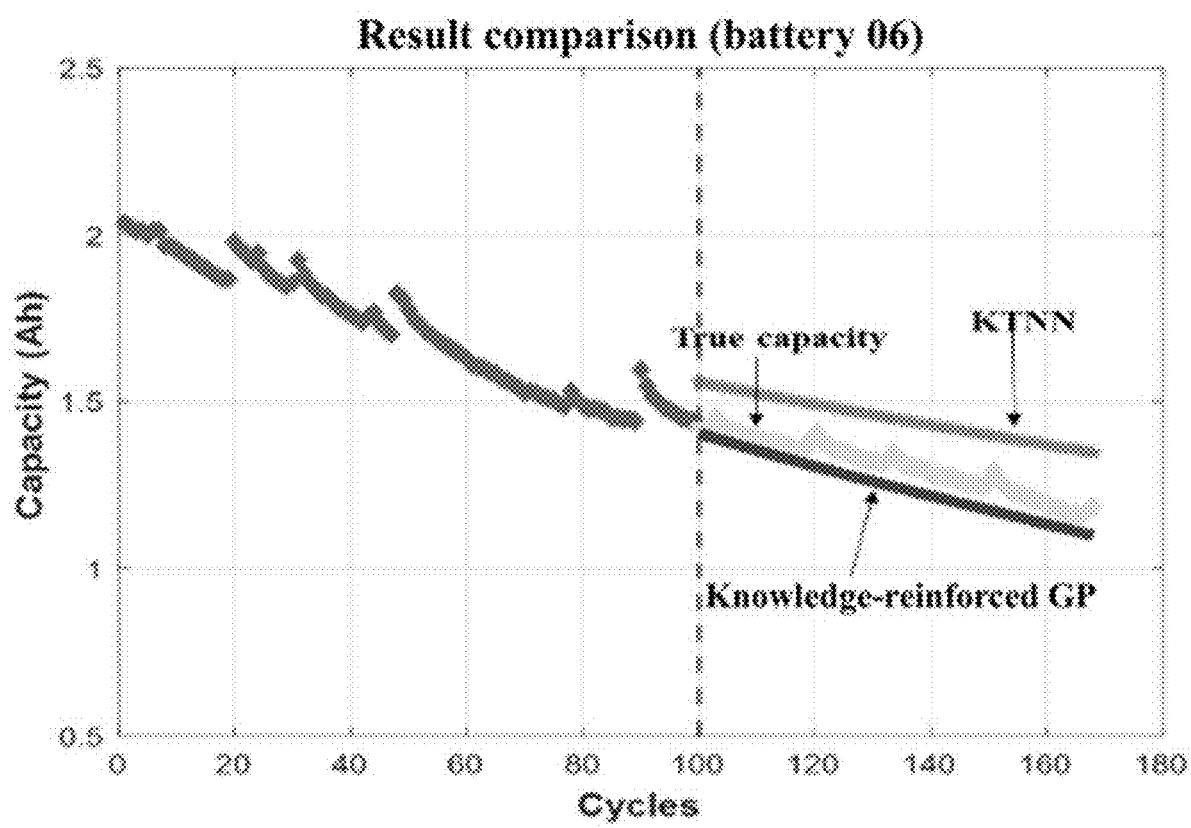
FIG. 11C depicts result comparison of capacity prognosis of battery 06 at cycle 100 between a knowledge-reinforced GP method and a KTNN method according to various disclosed embodiments of the present disclosure.
Figure 12A:
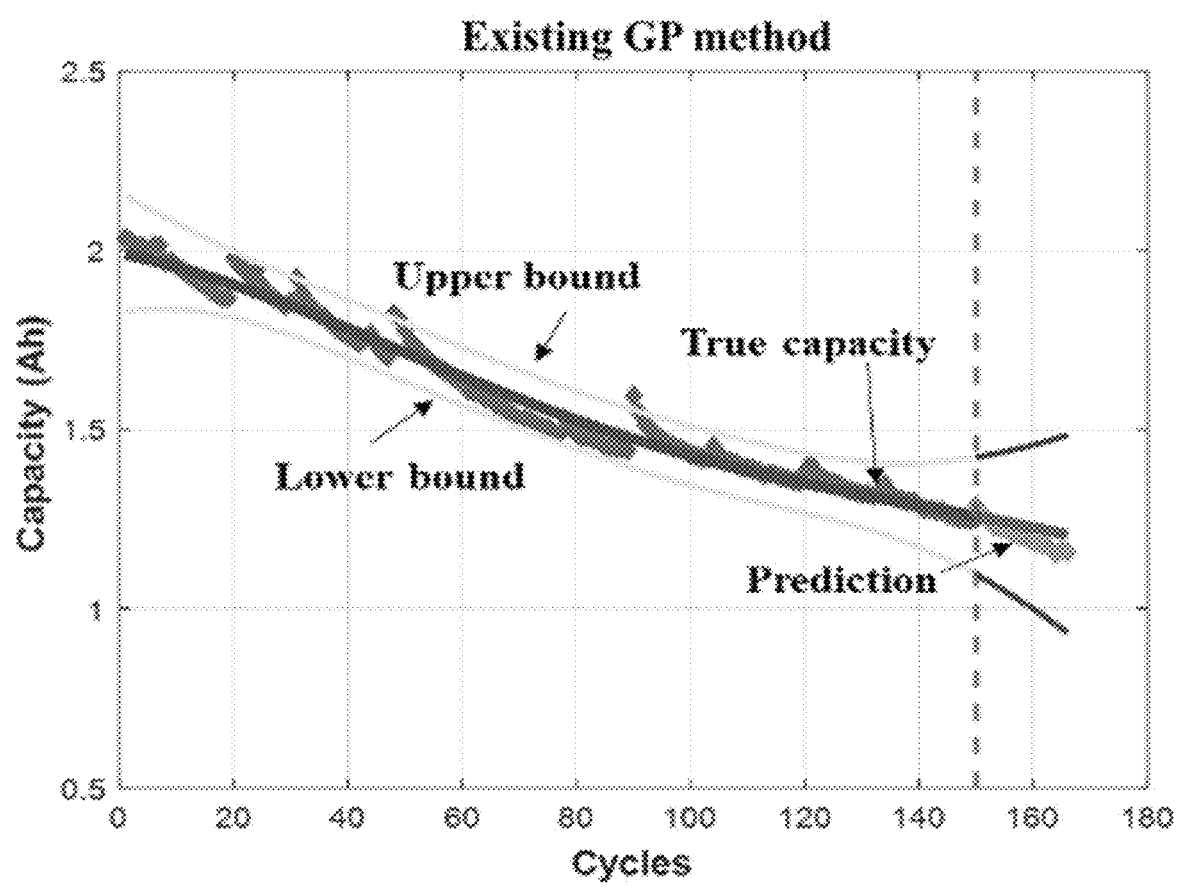
FIG. 12A depicts exemplary capacity prognosis of battery 06 at cycle 150 using an existing GP method according to various disclosed embodiments of the present disclosure.
Figure 12B:
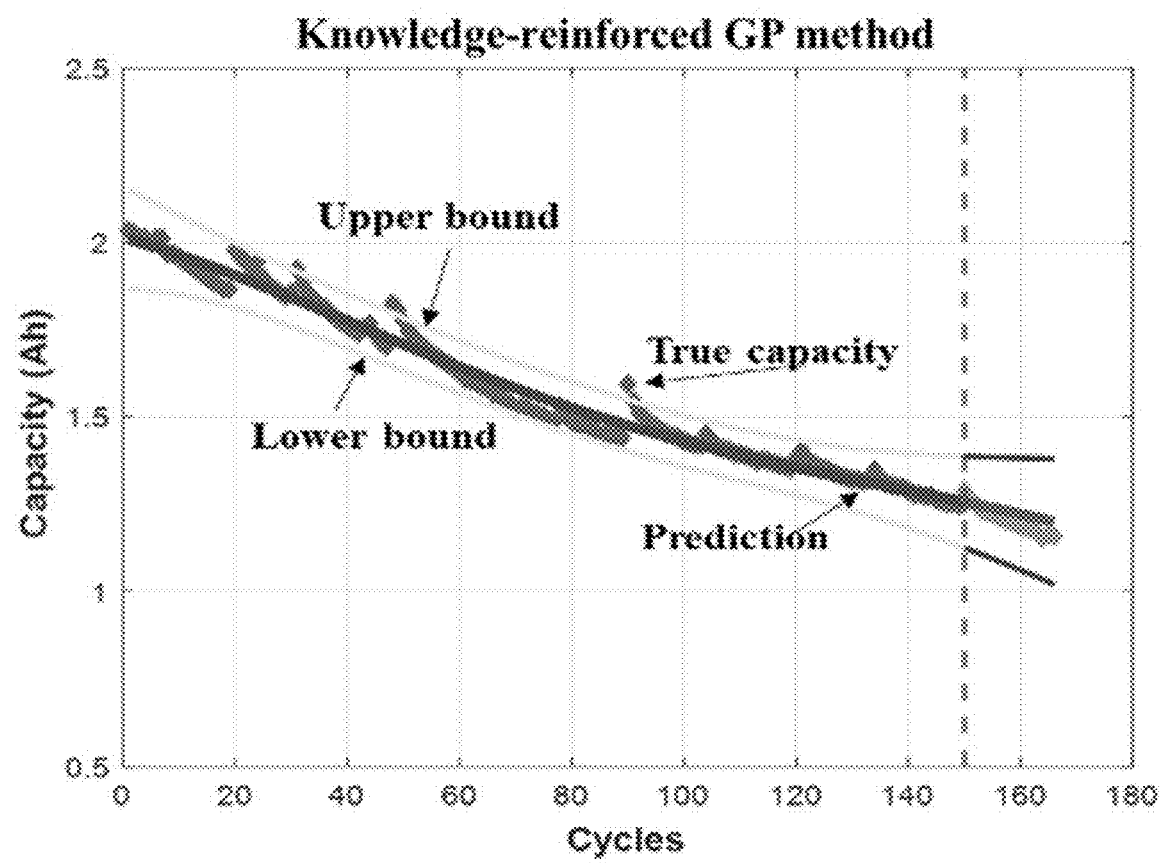
FIG. 12B depicts exemplary capacity prognosis of battery 06 at cycle 150 using a knowledge-reinforced GP method according to various disclosed embodiments of the present disclosure.
Figure 12C:
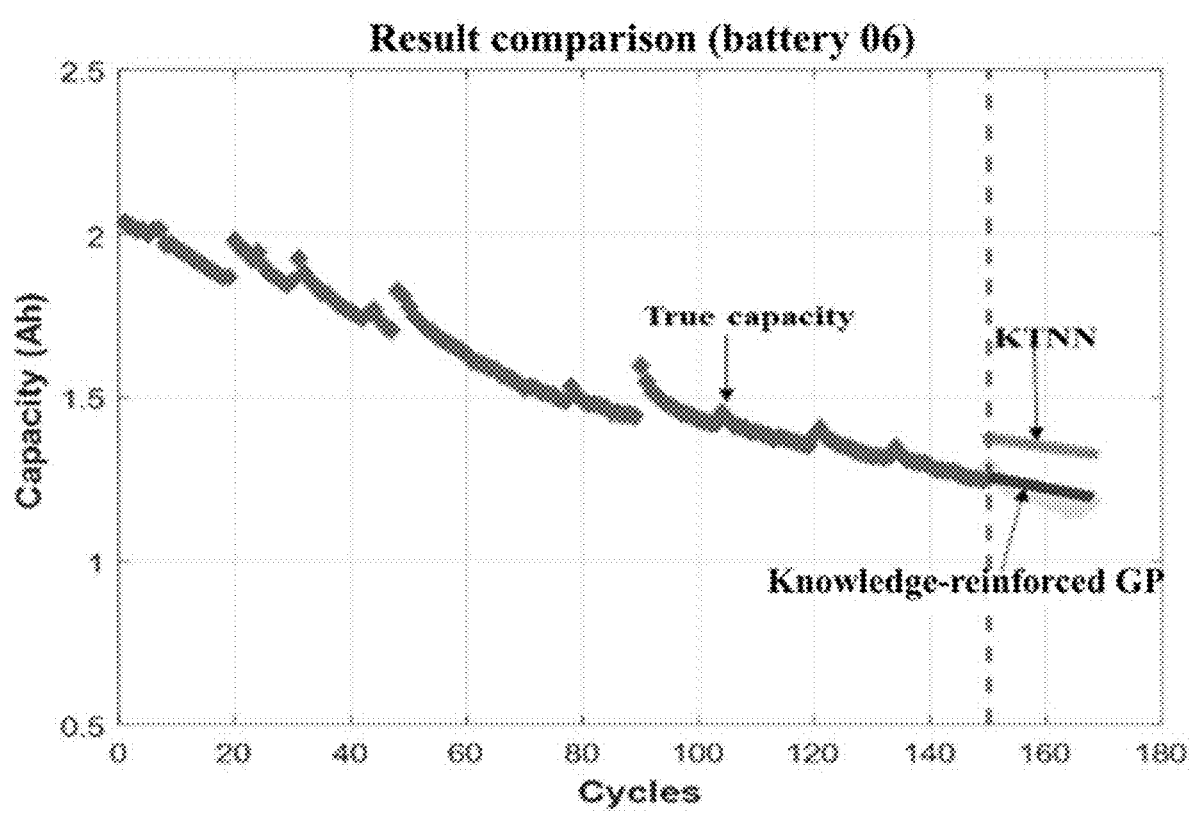
FIG. 12C depicts result comparison of capacity prognosis of battery 06 at cycle 150 between a knowledge-reinforced GP method and a KTNN method according to various disclosed embodiments of the present disclosure.

In various embodiments of the present disclosure, the following constraints: (1) the battery capacity should be within a boundary defined as [0, 2.5], and (2) the battery capacity should be decreasing over time, may be used as a piece of prior knowledge to facilitate the learning of capacity degradation behaviors. These constraints may be expressed as follows:

$$0 < f(x) < 2.5, \frac{df(x)}{dx} < 0 \quad (26)$$

where f(x) denotes the capacity function over working cycles, x denotes the number of cycles. To illustrate above-mentioned method in a clear fashion, referring to FIG. 7, the prediction process may be decomposed into three steps, namely, data processing, model training, and capacity predicting.

A comparison between above-mentioned knowledge-reinforced GP method and existing machine learning methods is presented to evaluate performance of the knowledge-reinforced GP method for RUL prediction of lithium-ion batteries. An existing knowledge transfer based neural network (KTNN) for RUL prediction had been developed. FIGS. 8-12 illustrate the comparison results of the battery 06 RUL predictions at different working cycles between the knowledge-reinforced GP method and the KTNN method, respectively. For instance, in FIG. 8, the training data points of the GP method may include X=[$x_1$, . . . , $x_5$], and Y=[$y_1$, . . . , $y_5$]; and the testing data may contain the rest of the cycles and actual discharging capacities. It can be observed that accuracy of capacity prediction for future cycles based on the existing GP method, the knowledge-reinforced GP method and the KTNN method may be improved by adding more training data. Nevertheless, the knowledge-reinforced GP method may achieve a consistently more accurate projection of battery capacity with much less uncertainties, especially for the cases with less training data in the beginning of battery life cycle. For the existing GP method, it may be seen that prediction of battery capacity for future working cycles may have chances to be increasing over cycles as demonstrated by the upper bound of GP predictions. With the prior knowledge, the knowledge-reinforced GP method may be able to guarantee that the battery capacity function is a monotonic decreasing function over time. Furthermore, the existing GP method may predict the battery capacities as negative values while the knowledge-reinforced GP method may make sure that all predictions of battery capacities are within a particular range from 0 to 2.5. To evaluate the prediction accuracy of the model quantitatively, the root mean square error (RMSE) of the lithium-ion battery RUL prediction may be used for comparison purpose. With actual capacity f(i) at ith cycle, the RMSE may be defined as follows:

$$RMSE = \sqrt{\left(\frac{1}{n}\sum_{i=1}^{n}(f(i) - f_*(i))^2\right)} \quad (27)$$

where f*(i) denotes capacity prediction.

The RMSEs for different methods are provided in Table 1. As shown in Table 1, the knowledge-reinforced GP method may achieve a lower RMSE than the existing GP method under different training conditions. In the scenario with only 5 training data points (i.e., 5 cycles), the RMSE of the existing GP method may be about 0.4004, while the RMSE of the knowledge-reinforced GP method may be about 0.0666. The comparison results may demonstrate that, by incorporating knowledge-based constraints, the knowledge-reinforced GP method may outperform the existing GP method.

TABLE 1

Comparison between knowledge-reinforced method and existing GP method

| Prediction method | Training conditions | | | | |
| --- | --- | --- | --- | --- | --- |
| | 5 cycles | 20 cycles | 50 cycles | 100 cycles | 150 cycles |
| Existing GP method | 0.4004 | 0.3823 | 0.3540 | 0.1199 | 0.0334 |
| Knowledge-reinforced GP method | 0.0666 | 0.0627 | 0.0569 | 0.0552 | 0.0201 |

Figure 13A:
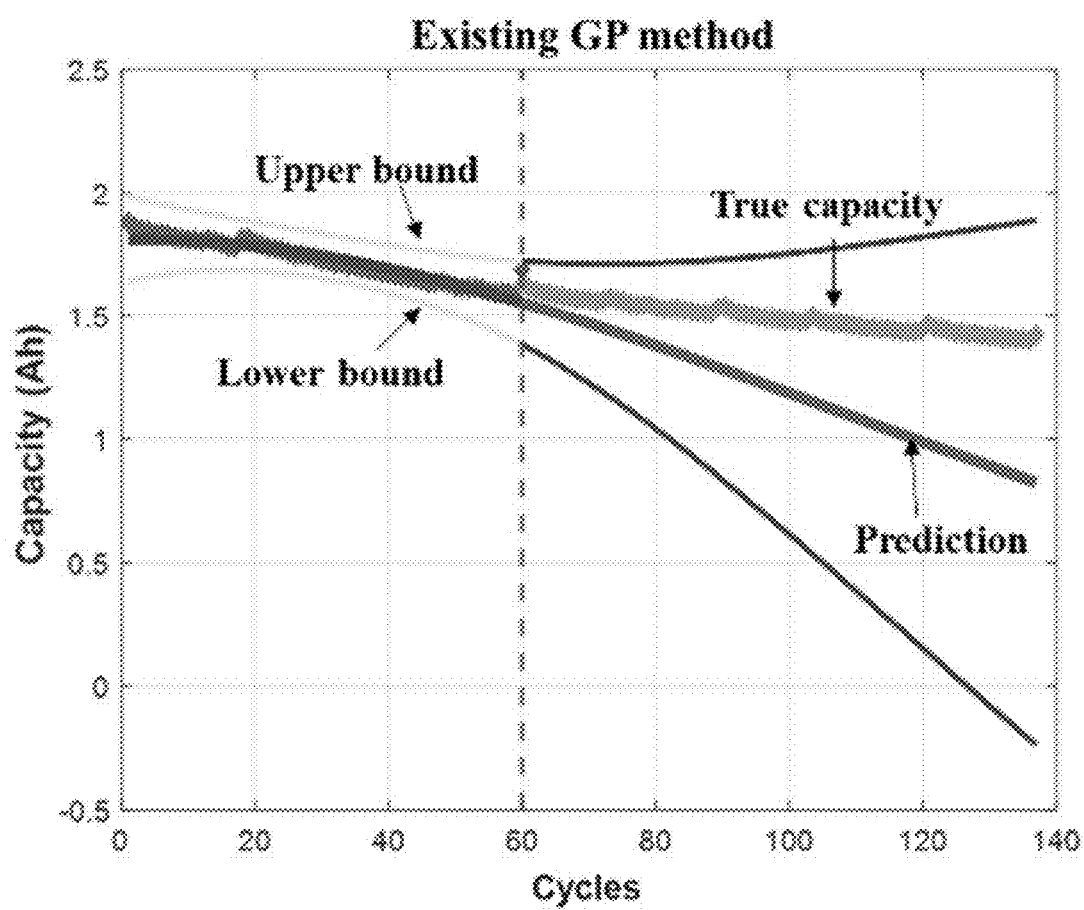
FIG. 13A depicts exemplary capacity prognosis of battery 07 at cycle 60 using an existing GP method according to various disclosed embodiments of the present disclosure.
Figure 13B:
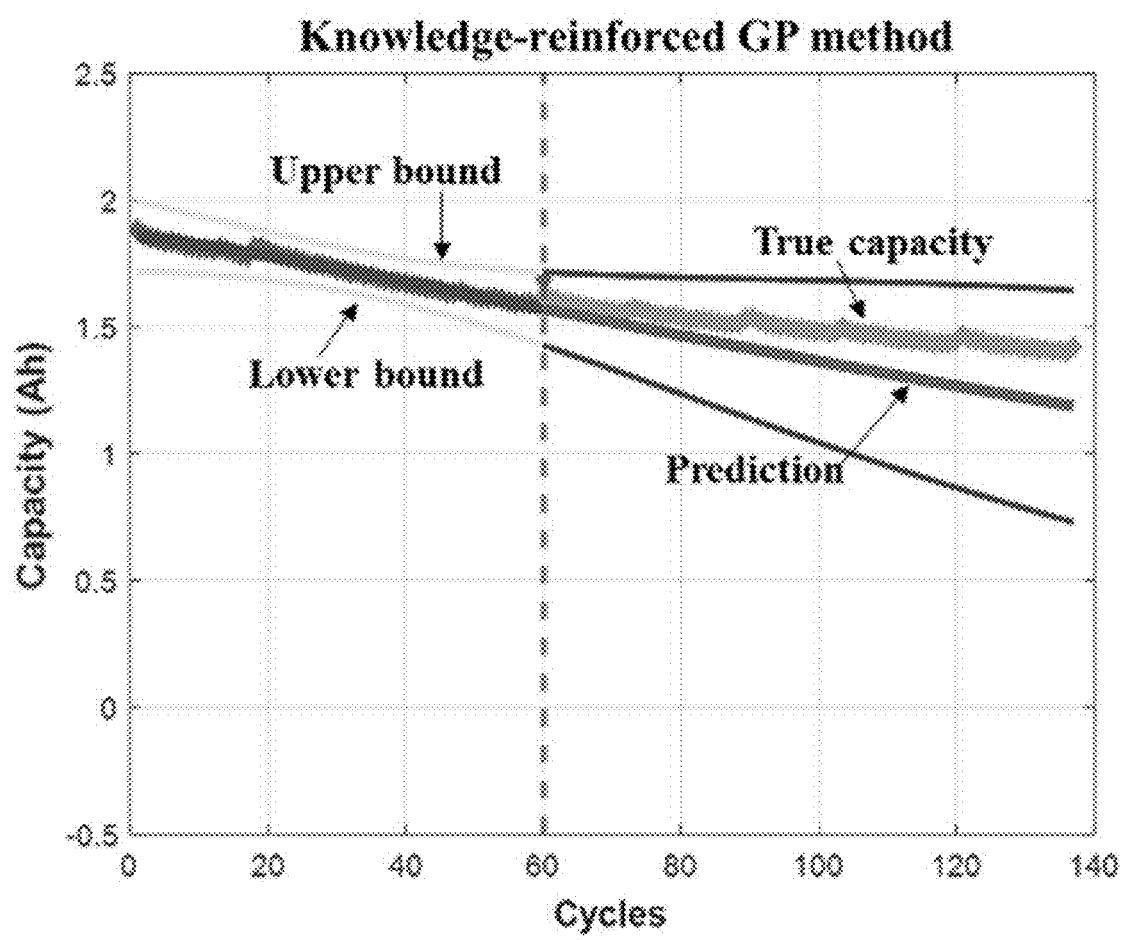
FIG. 13B depicts exemplary capacity prognosis of battery 07 at cycle 60 using a knowledge-reinforced GP method according to various disclosed embodiments of the present disclosure.
Figure 13C:
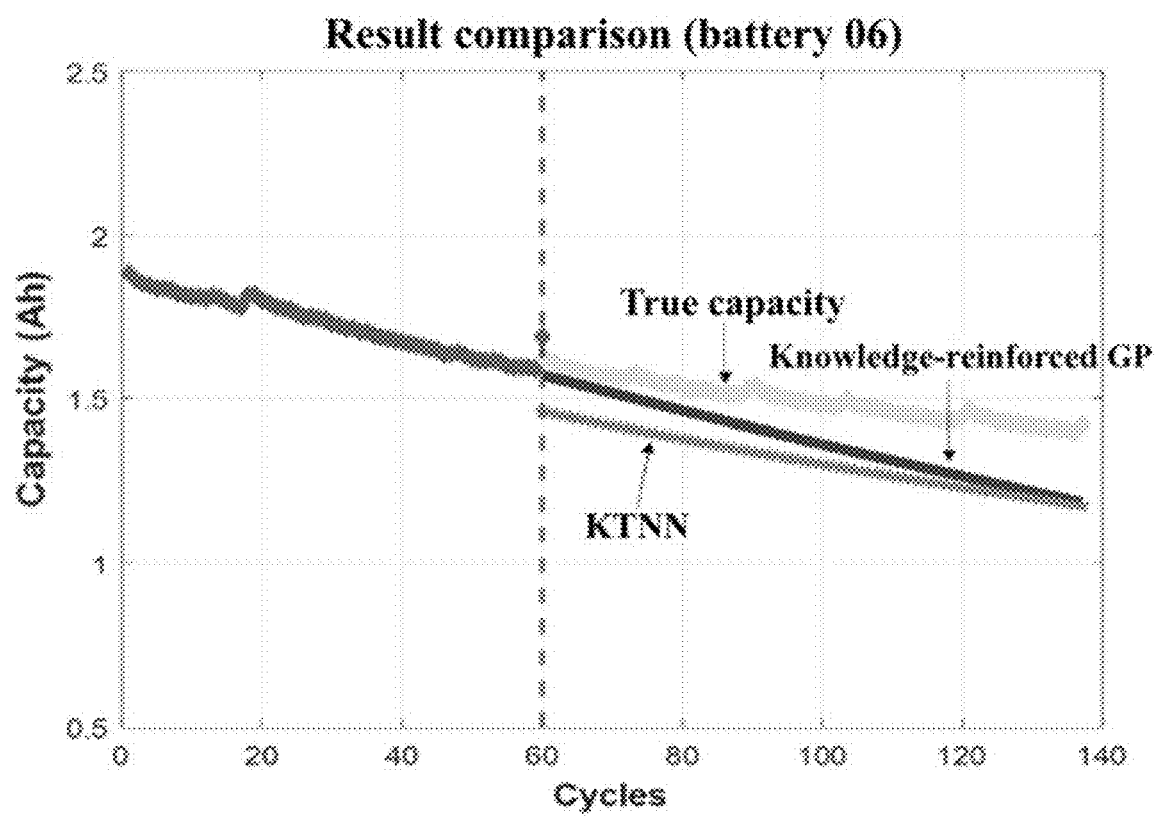
FIG. 13C depicts result comparison of capacity prognosis of battery 07 at cycle 60 between a knowledge-reinforced GP method and a KTNN method according to various disclosed embodiments of the present disclosure.
Figure 14A:
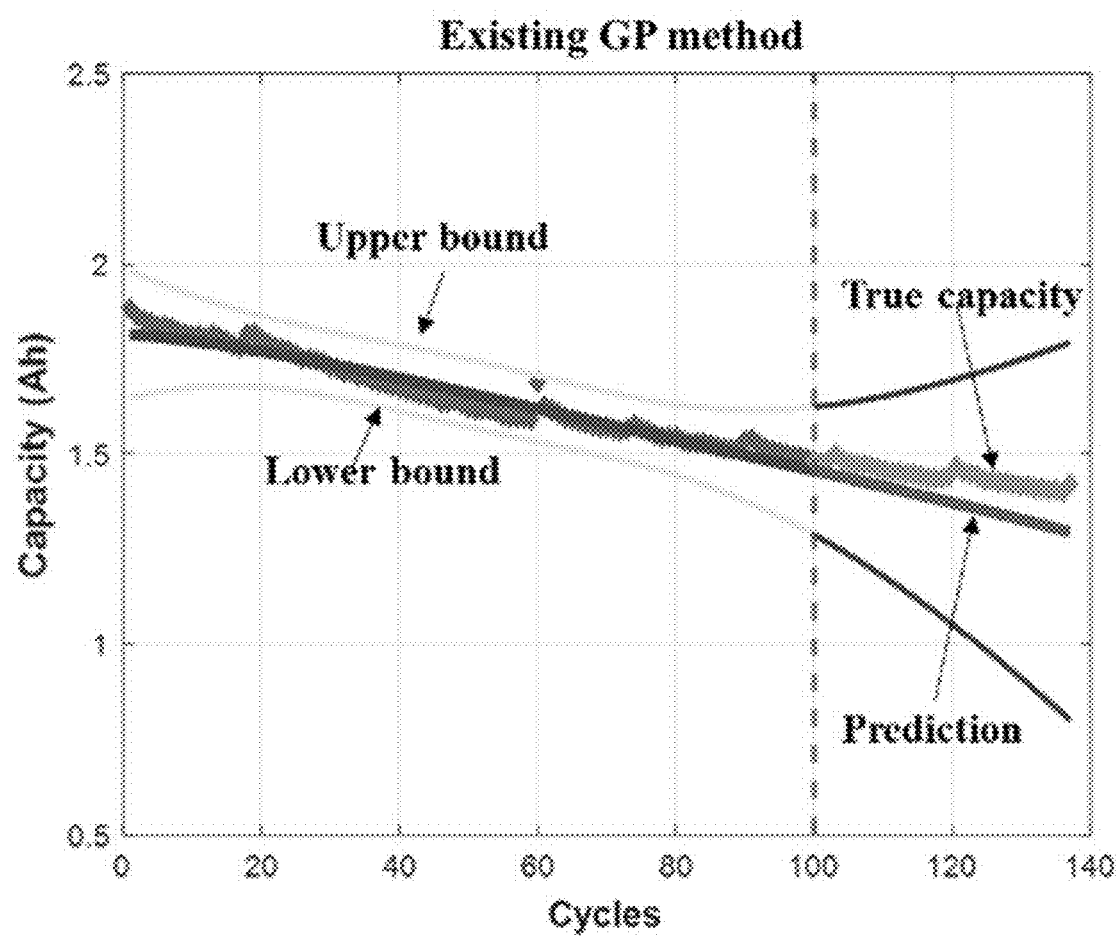
FIG. 14A depicts exemplary capacity prognosis of battery 07 at cycle 100 using an existing GP method according to various disclosed embodiments of the present disclosure.
Figure 14B:
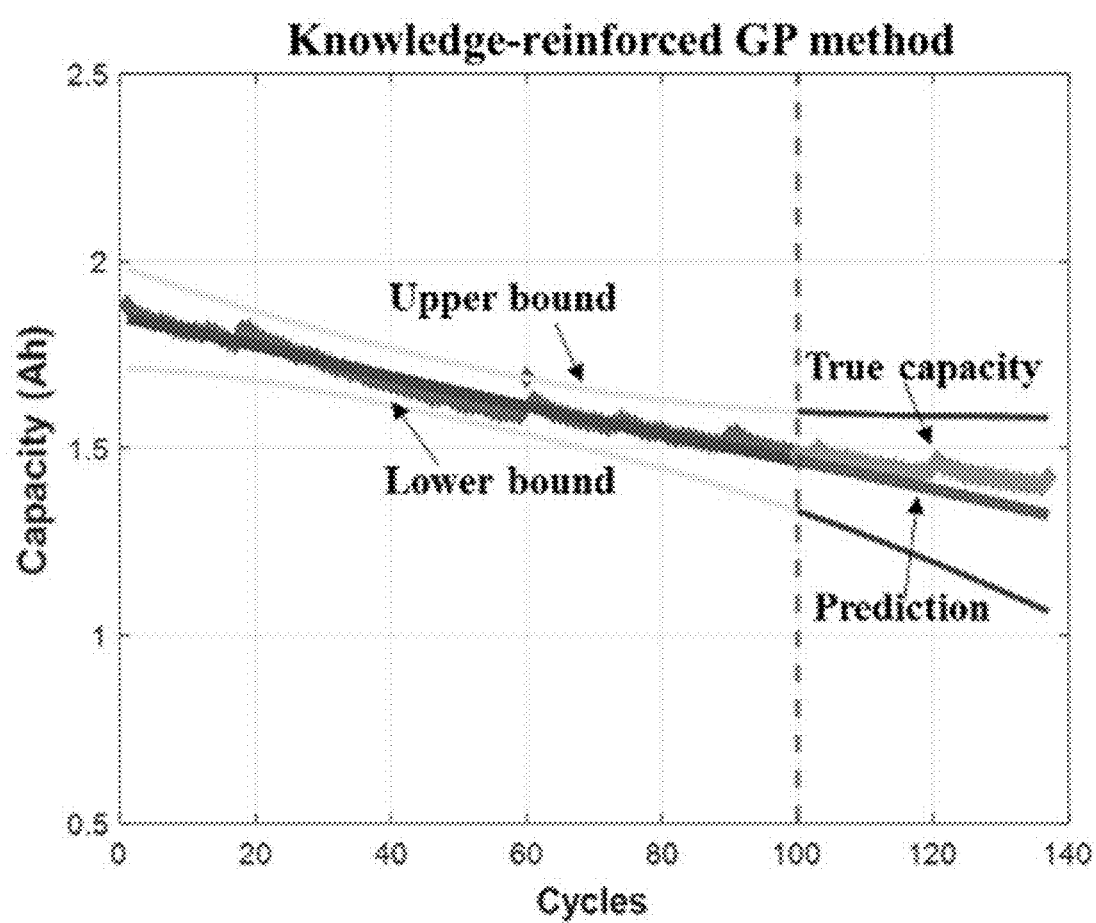
FIG. 14B depicts exemplary capacity prognosis of battery 07 at cycle 100 using a knowledge-reinforced GP method according to various disclosed embodiments of the present disclosure.
Figure 14C:
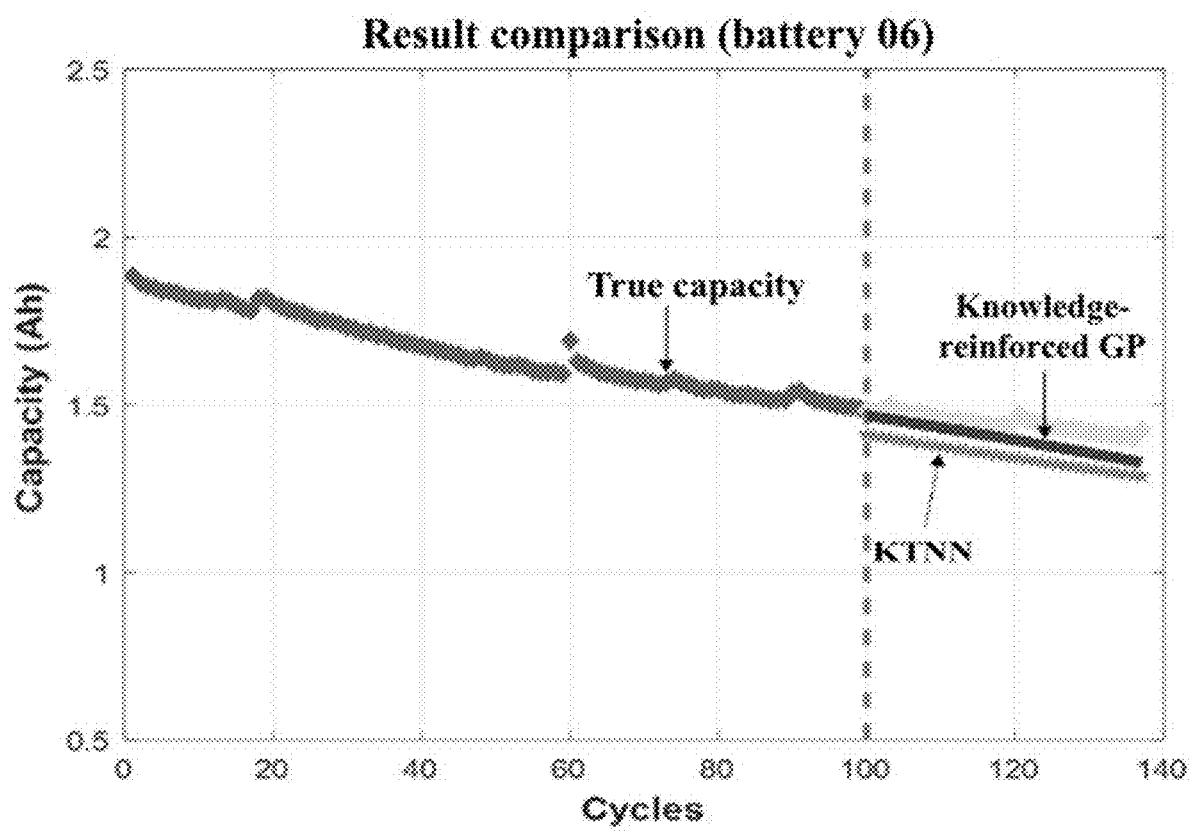
FIG. 14C depicts result comparison of capacity prognosis of battery 100 at cycle 60 between a knowledge-reinforced GP method and a KTNN method according to various disclosed embodiments of the present disclosure.

The knowledge-reinforced GP method had been also utilized to predict capacity fading for the battery 07. FIGS. 13-14 demonstrate the stochastic degradation models using the existing GP method, the knowledge-reinforced GP method and the KTNN method at working cycles 60 and 100 respectively. Similarly, the knowledge-reinforced machine learning method may provide more accurate prediction of battery capacities with less amount of uncertainties, especially for the cases when the battery capacities data is very limited at the beginning of battery life cycle. It is clearly demonstrated that adding knowledge-based constraints in the machine learning process may greatly reduce uncertainty for battery capacity prediction for future working cycles. By adaptively estimating the battery capacities using the DEKF algorithm, the stochastic degradation model of battery performance may be updated to reduce the uncertainty associated with capacity prognosis of lithium-ion batteries.

To further verify the effectiveness of the knowledge-reinforced machine learning method, the knowledge-reinforced GP method may be compared with existing battery RUL prognostics methods such as the support vector machine (SVM) method, the linear regression method, and the KTNN method. The battery 06 may be used to test the performance of different methods for RUL predictions using RMSEs. The RMSE values for different methods are shown in Table 2, which clearly demonstrate that the knowledge-reinforced machine learning (GP) method may achieve better performance for lithium-ion battery RUL predictions.

TABLE 2

RMSE of different methods

| Method | Linear regression | SVM | KTNN | Knowledge-reinforced GP |
|---|---|---|---|---|
| Battery 07 | 0.1690 | 0.2130 | 0.0666 | 0.0131 |

Figure 15A:
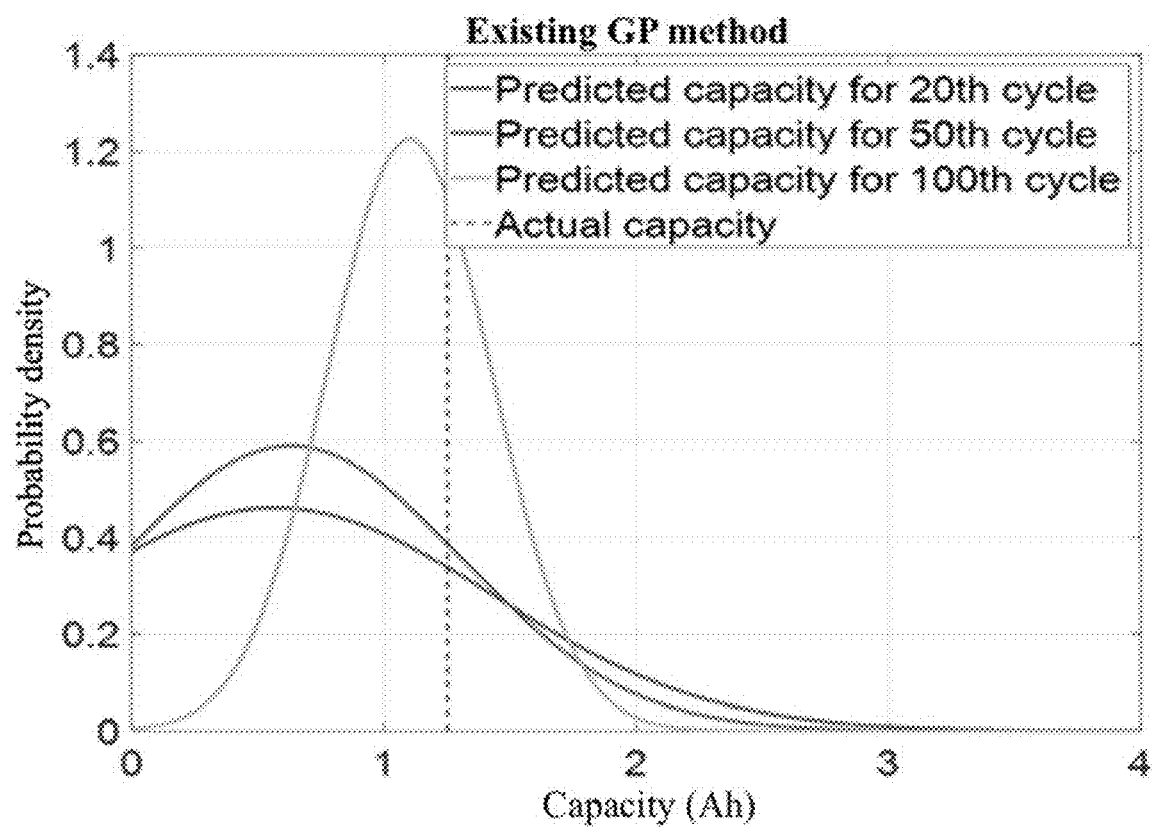
FIG. 15A depicts an exemplary capacity prediction of battery 06 at cycle 20, 50 and 100 using an existing GP method according to various disclosed embodiments of the present disclosure.
Figure 15B:
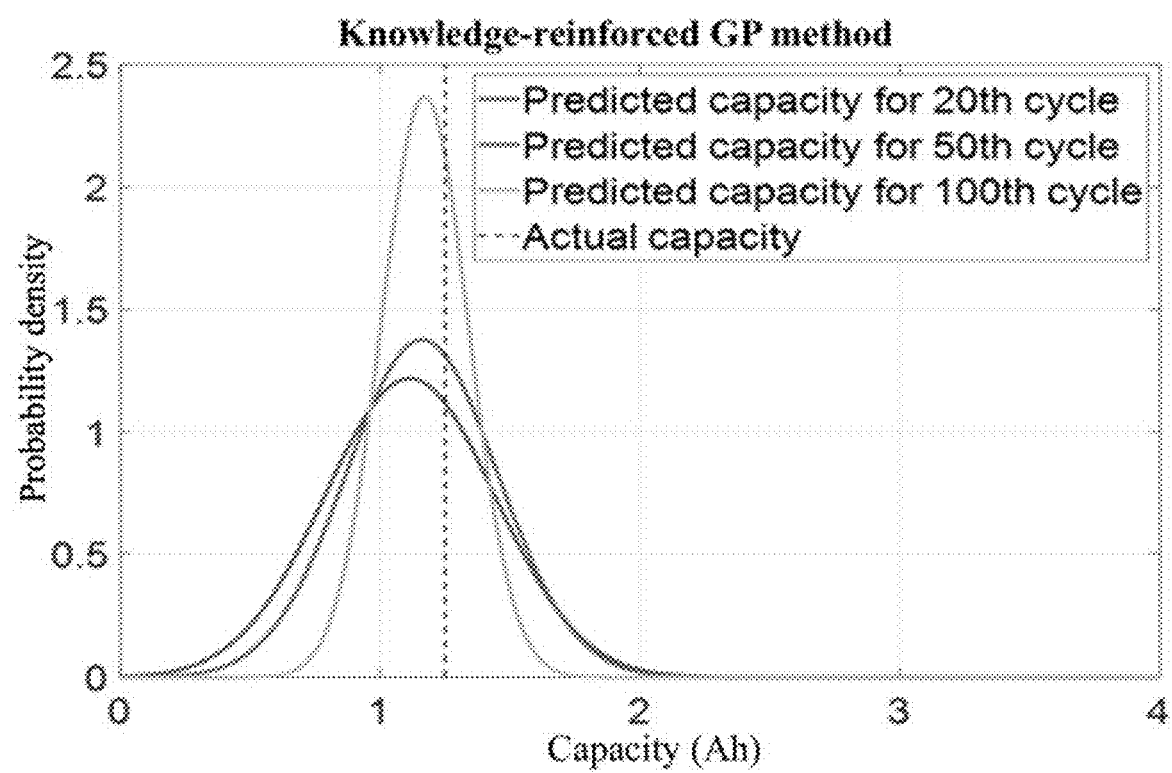
FIG. 15B depicts an exemplary capacity prediction of battery 06 at cycle 20, 50 and 100 using a knowledge-reinforced GP method according to various disclosed embodiments of the present disclosure.
Figure 16A:
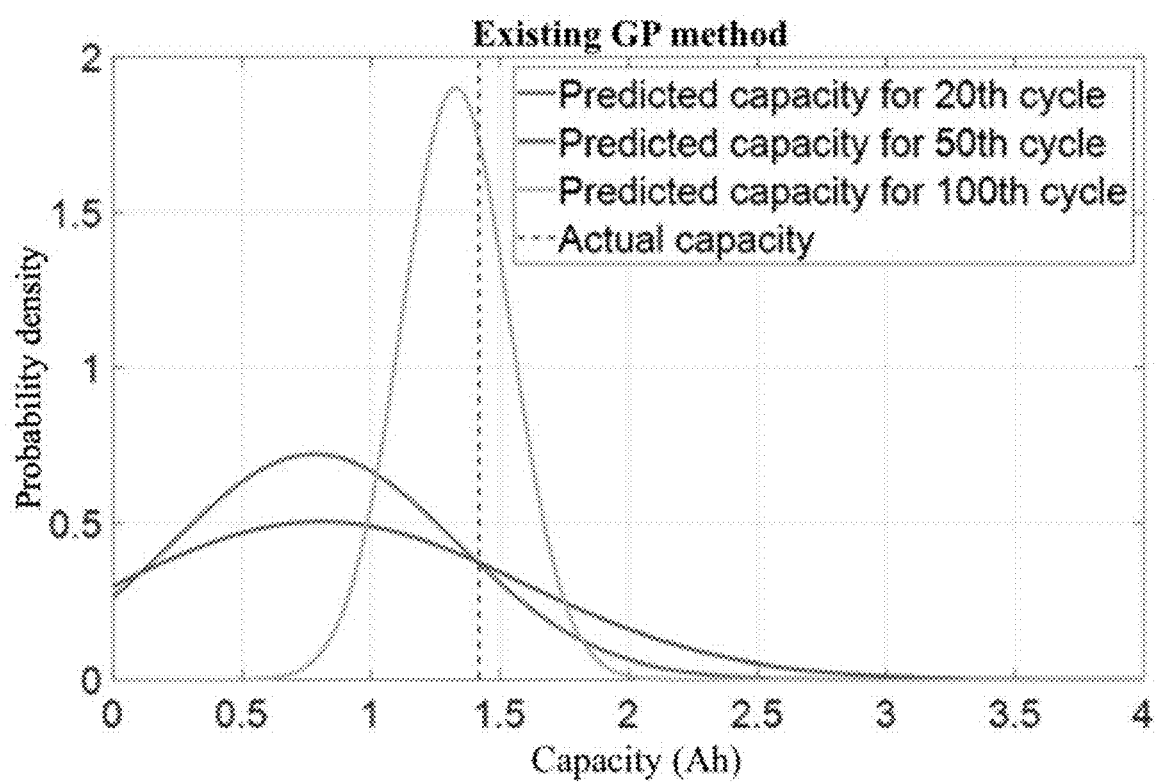
FIG. 16A depicts an exemplary capacity prediction of battery 07 at cycle 20, 50 and 100 using an existing GP method according to various disclosed embodiments of the present disclosure.
Figure 16B:
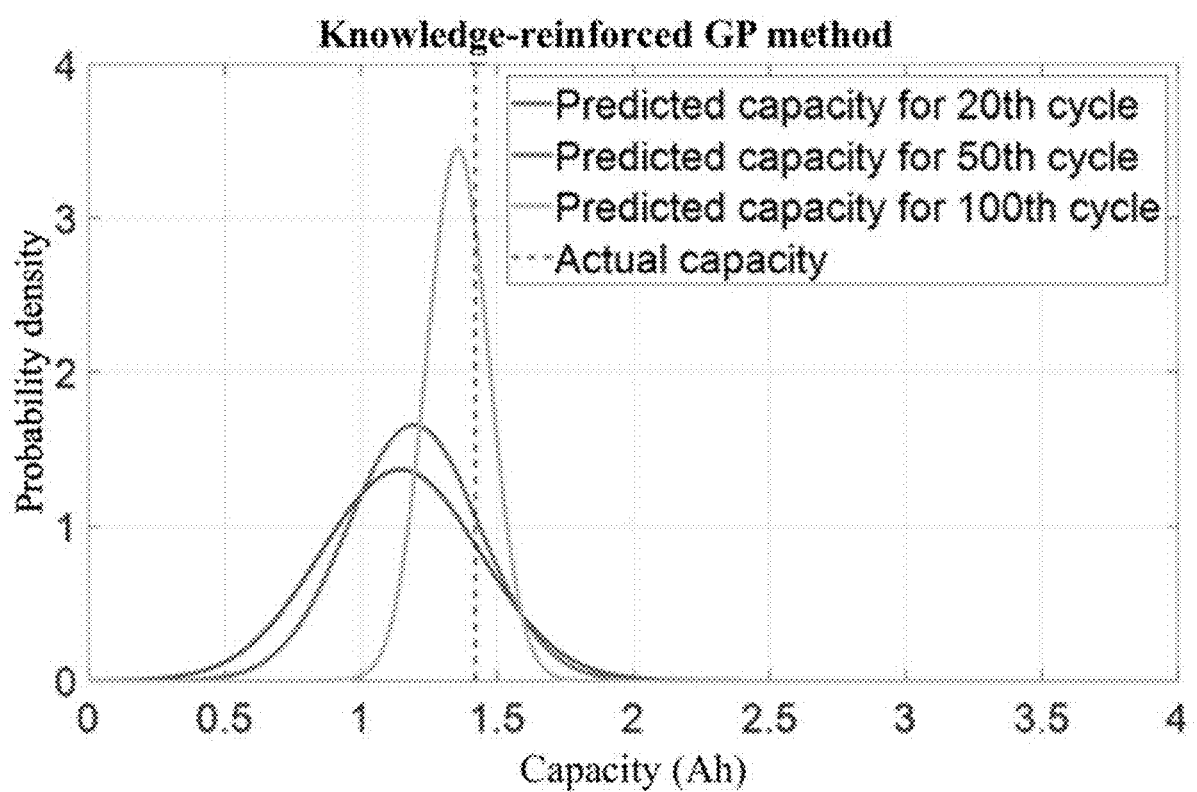
FIG. 16B depicts an exemplary capacity prediction of battery 07 at cycle 20, 50 and 100 using a knowledge-reinforced GP method according to various disclosed embodiments of the present disclosure.

With the stochastic degradation model, the capacity of batteries 06 and 07 at future working cycles may be predicted as a normal distribution. As disclosed above, the estimated capacity of batteries may be configured to update the knowledge-reinforced GP method. By adding online data of the capacity of batteries, the knowledge-reinforced GP method may capture more accurate information of capacity fade of individual batteries. FIGS. 15-16 illustrate the capacity prediction of future cycles for the batteries 06 and 07 from cycles 20, 50 and 100 respectively. Referring to FIGS. 15-16, the capacity prediction may become closer to the actual values, which may validate the effectiveness of the KRML method.

Various embodiments of the present disclosure further provide a battery thermal management system (BTMS) coupled with the stochastic degradation model, which may be configured to adjust lithium-ion battery temperature accordingly with varying working conditions via optimal control.

Significant work has been conducted on the design and evaluation of BTMS. Existing cooling technologies may include active liquid cooling, active air cooling, heat pipe, phase change material (PCM), and hybrid approaches of those technologies. Most of existing technologies may emphasize on the cooling aspect, while the studies of heating aspect have rarely been reported in the literature. Compared with other thermal management systems, air-based BTMS has been widely employed in EVs (electric vehicles) industry due to its remarkable advantages like lightweight, simple structure, low cost and the like. Two major existing structures of air-based BTMS may include Z-type and U-type on the module/pack level. Existing air cooling systems may attempt to rearrange the channels to uniformize air flow rate distribution with a lower pressure drop, thereby lowering maximum temperature and improving uniformity.

According to various embodiments of the present disclosure, after performing capacity prediction using the trained stochastic capacity degradation model to obtain remaining useful life (RUL) of one or more testing lithium-ion batteries, an air mass flow rate and a charging/discharging rate may be generated by a controller according to the RUL and the working condition of testing lithium-ion batteries. The air mass flow rate and the charging/discharging rate generated by the controller may be then inputted into the battery thermal management system (BTMS) to adjust lithium-ion battery temperature.

Figure 17:
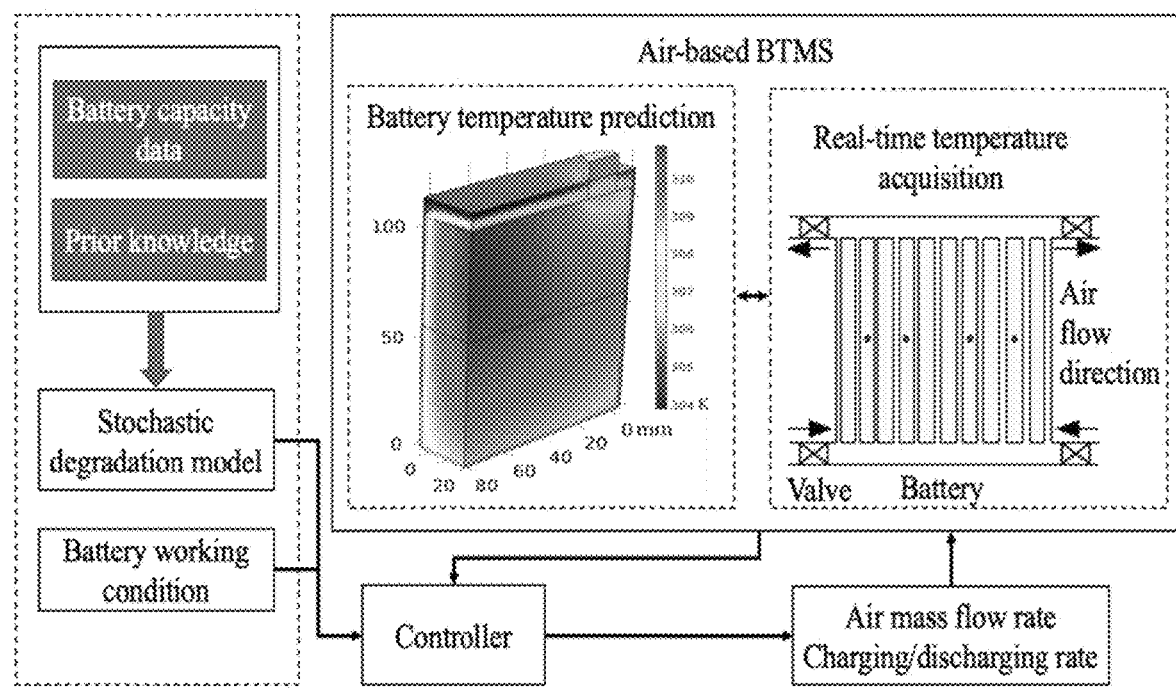
FIG. 17 depicts an exemplary self-adaptive lithium-ion battery framework according to various disclosed embodiments of the present disclosure.

FIG. 17 depicts an exemplary self-adaptive lithium-ion battery framework according to various disclosed embodiments of the present disclosure. Referring to FIG. 17, an air-based H-type BTMS with flexible controlling functionality is provided in various disclosed embodiments of the present disclosure. By controlling two valves located on outlets, the system may be capable of redistributing the cooling air flow rate of every passage, thereby reducing the maximum battery temperature and improving the temperature uniformity. It should be noted that the air may only flow via one inlet valve via optimal control, that is, another inlet valve may be closed. The on/off status of two air inlet valves may be determined via control in real time according to battery working conditions. The system may adjust the opening degree of each valve based on the module temperature and air mass flow rate. Key design parameters (e.g., passage spacing sizes) and control parameters (e.g., flow rate and valves opening degrees) may be optimized by considering uncertainties resulted from driving behavior, traffic, and weather conditions. Referring to FIG. 17, the temperature obtained from the battery temperature prediction may serve as a model to provide a model-based predictive control signal, and the real-time temperature acquired may be configured to perform feedback loop control.

In one embodiment, a model/data-based control for thermal management of battery modules may be provided. The objective of such control may be to explore a real-time model and data-based control strategy for the BTMS and disturbance forecasting. Such control strategy may be to overcome fundamental challenges associated with battery thermal management for improved performance, efficiency, safety, and longevity of the battery pack.

Real-time control may play a vital role in the performance, efficiency, and safety of the overall system. Existing study has compared the BTMS control performance using nonlinear back stepping, linear optimal control, and classical proportional integral controller (PI) control; and results had showed that both back stepping and optimal control may significantly improve battery core temperature regulation compared to PI control. More recently study had showed that nonlinear model predictive control (MPC) may provide faster warm-up times and overall better temperature control while consuming less electrical energy when compared to a non-predictive control strategy. While the results from these studies demonstrate potential benefits of advanced control, there may be certain limitations that need to be overcome to maximize the control performance of the BTMS. Firstly, different existing control strategies may achieve better thermal regulation by simply increasing the coolant flow rate through the battery pack. However, it comes at the cost of additional electrical power consumption which may reduce overall system efficiency. Secondly, EV battery systems may operate in a number of different modes such as fast charging, autonomous driving and the like. Existing control strategies may not account for the fact that each of these modes may have different operating conditions, levels of uncertainty, and control objectives. The multi-faceted control design may establish unique modes of operation with each mode having different optimal control formulations to maximize control objectives specific to each mode. Finally, current model-based control formulations may not seamlessly integrate historical data to improve the accuracy of dynamic system models and disturbance forecasting. The model/data-based control method may provide an integrated solution that combines model-based optimal control, data-based model adaptation, mode-dependent disturbance forecasting and uncertainty quantification.

Effective control of the BTMS may be challenging due to 1) the distributed, complex thermal dynamics of potentially hundreds of battery cells within the pack, 2) the non-colocation and under-actuation of air flow control that results in time delays due to fluid transport and lack of local thermal management of each individual cell, and 3) the mode-dependent, heterogeneous, and stochastic heat generation disturbances caused by charging and discharging of each cell.

To overcome above-mentioned problems, the MPC framework may be developed by integrating optimal open-loop and closed-loop control strategies with stochastic disturbance forecasting. The control framework may be shown in FIG. 17 according to various embodiments of the present disclosure. For the H-type air cooling architecture, the primary control inputs may include total air mass flow rate via continuously-variable control of the single blower/fan and further include the air flow routing through the battery pack via a combination of discrete and continuous control of four valves shown in FIG. 17. The control objective may be to minimize a weighted combination of blower/fan power, thermal gradients between cells, and constraint violations of upper and lower bounds on the maximum and minimum cell temperatures in the pack and improve the RULs of batteries.

In one embodiment, the control input for the BTMS may include one or more key elements. The multi-element control law used in the open-loop (feedforward) and feedback MPC framework may have shown to produce significant control performance improvements for systems with model uncertainty, measurement noise, and unmodelled delay.

In one embodiment, the first element may be an optimal, mode-dependent, open-loop control trajectory determined by a co-design procedure. The open-loop control trajectory may be optimized to minimize above control objectives for each mode of BTMS operation in conjunction with physical system design. The open-loop nature may allow such control input to be significantly aggressive while avoiding the potential for instability frequently observed in feedback control designs for uncertain systems with time delays. Such aggressive optimal control may significantly improve the BTMS performance during operating modes like charging where current and future system operation is well-defined and repeatable.

Since the open-loop control trajectory does not take into account current state of the system, the second control element may be an output feedback control law. Such closed-loop control law may be designed to augment the open-loop control signal to account for current state of the system. The output vector may include measured charging/discharging rate of the battery pack and temperature measurements from sensors strategically placed in the battery pack. The design of output vector may be included in the co-design process via sparsity-promoting optimization of the matrix. In such way, a minimum number of temperature sensors may be optimally placed throughout the battery pack to measure only the temperatures identified to be valuable for feedback control. The feedback control law may be mode-dependent to account for the fact that certain temperature measurements may be critical during certain modes of operation but unnecessary during other modes.

Various embodiments of the present disclosure further provide an electronic device. The device may include a memory, configured to store program instructions for performing a self-adaptive lithium-ion battery method using knowledge-reinforced machine learning and Kalman filtering; and a processor, coupled with the memory and, when executing the program instructions. The method may include training an artificial neural network and synchronizing the ANN with DEKFs to capture battery capacity data of each of one or more lithium-ion batteries; integrating prior knowledge with Gaussian process regression to form an integrated knowledge-reinforced Gaussian process regression; training a stochastic capacity degradation model by employing the integrated knowledge-reinforced Gaussian process regression with the captured battery capacity data to obtain a trained stochastic capacity degradation model; performing capacity prediction using the trained stochastic capacity degradation model to obtain RUL of one or more testing lithium-ion batteries; generating an air mass flow rate and a charging/discharging rate by a controller according to the RUL and a working condition of the one or more testing lithium-ion batteries; and inputting the air mass flow rate and the charging/discharging rate generated by the controller into a BTMS to adjust lithium-ion battery temperature.

Various embodiments of the present disclosure provide a non-transitory computer-readable storage medium, containing program instructions for, when being executed by a processor, performing a self-adaptive lithium-ion battery method using knowledge-reinforced machine learning and Kalman filtering. The method may include training an artificial neural network and synchronizing the ANN with DEKFs to capture battery capacity data of each of one or more lithium-ion batteries; integrating prior knowledge with Gaussian process regression to form an integrated knowledge-reinforced Gaussian process regression; training a stochastic capacity degradation model by employing the integrated knowledge-reinforced Gaussian process regression with the captured battery capacity data to obtain a trained stochastic capacity degradation model; performing capacity prediction using the trained stochastic capacity degradation model to obtain RUL of one or more testing lithium-ion batteries; generating an air mass flow rate and a charging/discharging rate by a controller according to the RUL and a working condition of the one or more testing lithium-ion batteries; and inputting the air mass flow rate and the charging/discharging rate generated by the controller into a BTMS to adjust lithium-ion battery temperature.

From above-mentioned embodiments, it may be seen that the solutions provided in the present disclosure may achieve at least following beneficial effects. The present disclosure provides a data-driven and generic machine learning method which may handle the issue due to the variations in batteries, different operating and manufacturing conditions. In addition, the disclosed machine learning method may be robust for estimating SoC and capacity in the long term due to the step by step update of the neural network to track different battery fade processes. Furthermore, the knowledge-reinforced machine learning method may allow the usage of prior knowledge for the development of stochastic degradation models of lithium-ion batteries, which may greatly improve the accuracy of capacity prediction for lithium-ion batteries. The comparison results demonstrate that the knowledge-reinforced machine learning method may accurately predict battery capacity for future working cycles. In addition, the self-adaptive lithium-ion battery framework may improve battery energy management by adjusting lithium-ion battery temperature.

The embodiments disclosed herein may be exemplary only. Other applications, advantages, alternations, modifications, or equivalents to the disclosed embodiments may be obvious to those skilled in the art and be intended to be encompassed within the scope of the present disclosure.

What is claimed is:

1. A self-adaptive lithium-ion battery method using knowledge-reinforced machine learning (KRML) and Kalman filtering, comprising:
    training an artificial neural network (ANN) and synchronizing the ANN with dual extended Kalman filters (DEKFs) to capture battery capacity data of each of one or more lithium-ion batteries;
    integrating prior knowledge with Gaussian process regression to form an integrated knowledge-reinforced Gaussian process regression;
    training a stochastic capacity degradation model by employing the integrated knowledge-reinforced Gaussian process regression with the captured battery capacity data to obtain a trained stochastic capacity degradation model;

performing capacity prediction using the trained stochastic capacity degradation model to obtain remaining useful life (RUL) of one or more testing lithium-ion batteries;

generating an air mass flow rate and a charging/discharging rate by a controller according to the RUL and a working condition of the one or more testing lithium-ion batteries; and inputting the air mass flow rate and the charging/discharging rate generated by the controller into a battery thermal management system (BTMS) to adjust lithium-ion battery temperature.

2. The method according to claim 1, wherein:
the prior knowledge includes that a battery capacity is a positive value and lower than a battery maximum capacity, and monotonically decreases over time.

3. The method according to claim 1, wherein:
the DEKFs includes a top EKF and a bottom EKF which are connected in parallel with each other.

4. The method according to claim 1, wherein:
the ANN is trained using a historical dataset from a baseline battery to capture dynamics of the baseline battery.

5. The method according to claim 1, wherein:
the KRML includes a diagnosis module using the ANN and the DEKFs, and a prognosis module using the integrated knowledge-reinforced Gaussian process regression.

6. The method according to claim 1, wherein:
the working condition of the one or more testing lithium-ion batteries includes a temperature, a charging/discharging profile, and/or a humidity.

7. An electronic device, comprising:
a memory, configured to store program instructions for performing a self-adaptive lithium-ion battery method using knowledge-reinforced machine learning (KRML) and Kalman filtering; and
a processor, coupled with the memory and, when executing the program instructions, configured for:
training an artificial neural network (ANN) and synchronizing the ANN with dual extended Kalman filters (DEKFs) to capture battery capacity data of each of one or more lithium-ion batteries;
integrating prior knowledge with Gaussian process regression to form an integrated knowledge-reinforced Gaussian process regression;
training a stochastic capacity degradation model by employing the integrated knowledge-reinforced Gaussian process regression with the captured battery capacity data to obtain a trained stochastic capacity degradation model;
performing capacity prediction using the trained stochastic capacity degradation model to obtain remaining useful life (RUL) of one or more testing lithium-ion batteries;
generating an air mass flow rate and a charging/discharging rate by a controller according to the RUL and a working condition of the one or more testing lithium-ion batteries; and
inputting the air mass flow rate and the charging/discharging rate generated by the controller into a battery thermal management system (BTMS) to adjust lithium-ion battery temperature.

8. The electronic device according to claim 7, wherein:
the prior knowledge includes that a battery capacity is a positive value and lower than a battery maximum capacity, and monotonically decreases over time.

9. The electronic device according to claim 7, wherein:
the DEKFs includes a top EKF and a bottom EKF which are connected in parallel with each other.

10. The electronic device according to claim 7, wherein:
the ANN is trained using a historical dataset from a baseline battery to capture dynamics of the baseline battery.

11. The electronic device according to claim 7, wherein:
the KRML includes a diagnosis module using the ANN and the DEKFs, and a prognosis module using the integrated knowledge-reinforced Gaussian process regression.

12. The electronic device according to claim 7, wherein:
the working condition of the one or more testing lithium-ion batteries includes a temperature, a charging/discharging profile, and/or a humidity.

13. A non-transitory computer-readable storage medium, containing program instructions for, when being executed by a processor, performing a self-adaptive lithium-ion battery method using knowledge-reinforced machine learning (KRML) and Kalman filtering, the method comprising:
training an artificial neural network (ANN) and synchronizing the ANN with dual extended Kalman filters (DEKFs) to capture battery capacity data of each of one or more lithium-ion batteries;
integrating prior knowledge with Gaussian process regression to form an integrated knowledge-reinforced Gaussian process regression;
training a stochastic capacity degradation model by employing the integrated knowledge-reinforced Gaussian process regression with the captured battery capacity data to obtain a trained stochastic capacity degradation model;
performing capacity prediction using the trained stochastic capacity degradation model to obtain remaining useful life (RUL) of one or more testing lithium-ion batteries;
generating an air mass flow rate and a charging/discharging rate by a controller according to the RUL and a working condition of the one or more testing lithium-ion batteries; and
inputting the air mass flow rate and the charging/discharging rate generated by the controller into a battery thermal management system (BTMS) to adjust lithium-ion battery temperature.

14. The storage medium according to claim 13, wherein:
the prior knowledge includes that a battery capacity is a positive value and lower than a battery maximum capacity, and monotonically decreases over time.

15. The storage medium according to claim 13, wherein:
the DEKFs includes a top EKF and a bottom EKF which are connected in parallel with each other.

16. The storage medium according to claim 13, wherein:
the ANN is trained using a historical dataset from a baseline battery to capture dynamics of the baseline battery.

17. The storage medium according to claim 13, wherein:
the KRML includes a diagnosis module using the ANN and the DEKFs, and a prognosis module using the integrated knowledge-reinforced Gaussian process regression.

18. The storage medium according to claim 13, wherein:
the working condition of the one or more testing lithium-ion batteries includes a temperature, a charging/discharging profile, and/or a humidity.

* * * * *